United States Patent
Yamamoto et al.

(10) Patent No.: US 6,279,025 B1
(45) Date of Patent: *Aug. 21, 2001

(54) PARALLEL PROCESSING PROCEDURE SELECTING APPARATUS AND METHOD SELECTING AND IMPLEMENTING PARALLEL-EXECUTABLE PROCESSING PROCEDURES

(75) Inventors: Hiroaki Yamamoto; Hajime Nakai; Toshinori Wakako, all of Numazu; Kazuyoshi Watanabe, Tagata-gun, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/666,931

(22) Filed: Jun. 20, 1996

(30) Foreign Application Priority Data

Jun. 22, 1995 (JP) ........................................ 7-156570

(51) Int. Cl.$^7$ ............................................ G06F 9/00
(52) U.S. Cl. .............................. 709/100; 709/102
(58) Field of Search ................... 395/701–710; 709/100–110; 712/200, 203, 212, 213, 216, 207

(56) References Cited

U.S. PATENT DOCUMENTS

| | | | |
|---|---|---|---|
| 5,404,520 | * 4/1995 | Sonobe | 709/101 |
| 5,524,242 | * 6/1996 | Aida et al. | 395/650 |
| 5,664,138 | 9/1997 | Yoshida . | |

FOREIGN PATENT DOCUMENTS 1-259446   10/1989   (JP) .
6-202881    7/1994   (JP) .

OTHER PUBLICATIONS

Looptool User's Guide, Sunsoft, Aug. 1994.*

Chu et al, Parallel Filing Subroutines in Sequential Programs, IEEE, 1994.*

*Approach to Automatic Parallelization of Batch Processing*, Toshinori Wakago, et. al., pp. 1–12 and attached Figures 2.1 through 6.1.

* cited by examiner

Primary Examiner—Majid Banankhah
(74) Attorney, Agent, or Firm—Staas & Halsey LLP

(57) ABSTRACT

In a JCL analyzing apparatus for a job having a plurality of job steps, an application method of a data set is inspected to select the data set applicable to a pipe data set in view of generating a job step matrix. Utilizing information about the job step matrix for the continuous job step groups using the applicable data set, the job step groups are checked to determine whether they are parallel-executable. If the job steps groups are all parallel-executable, a data set can be applicable to the pipe data set. If the job step groups overlap, these groups are summarized, when possible, utilizing the information about the job step matrix to decide the parallel-executable job step groups.

31 Claims, 20 Drawing Sheets

FIG. 13

| JOB STEP NUMBER | DD NUMBER | JCL | | |
|---|---|---|---|---|
| | | //TEST | JOB | |
| 1 | | //ST1 | EXEC | PGM=TEST1 |
| 1 | 1 | //DD1 | DO | DSN=Z,DISP=OLD |
| 1 | 2 | //DD2 | DO | DSN=&&A, DISP=(NEW, PASS) |
| 2 | | //ST2 | EXEC | PGM=TEST2 |
| 2 | 1 | //DD1 | DO | DSN=&&B, DISP=(NEW, PASS) |
| 3 | | //ST3 | EXEC | PGM=TEST3 |
| 3 | 1 | //DD1 | DO | DSN=&&A, DISP=(OLD, DELETE) |
| 4 | | //ST4 | EXEC | PGM=TEST4 |
| 4 | 1 | //DD1 | DO | DSN=&&B, DISP=(OLD, DELETE) |
| 4 | 2 | //DD2 | DO | DSN=Z, DISP=SHR |
| 4 | 3 | //DD3 | DO | DSN=&&C, DISP=(NEW, PASS) |
| 5 | | //ST5 | EXEC | PGM=TEST5 |
| 5 | 1 | //DD1 | DO | DSN=&&C, DISP=(OLD,DELETE) |
| 5 | 2 | //DD2 | DO | DSN=&&D, DISP=(NEW, PASS) |
| 6 | | //ST6 | EXEC | PGM=TEST6 |
| 6 | 1 | //DD1 | DO | DSN=&&D, DISP=(OLD, DELETE) |
| 7 | | //ST7 | EXEC | PGM=TEST7 |
| 7 | 1 | //DD1 | DO | DSN=Z, DISP=SHR |
| | | // | | |

FIG. 14

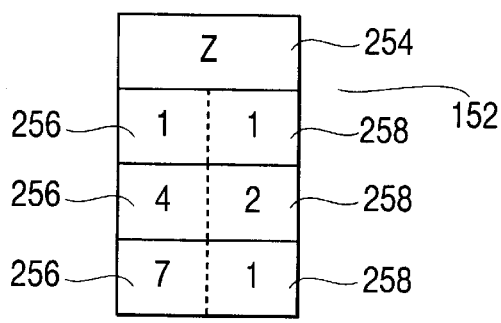

FIG. 32

| JOB STEP NUMBER | DD NUMBER | JCL | | PARA GRP | PIPE |
|---|---|---|---|---|---|
| | | //TEST | JOB | | |
| 1 | | //ST1 | EXEC PGM=TEST1 | | |
| 1 | 1 | //DD1 | DSN=Z,DISP=OLD | | |
| 1 | 2 | //DD2 | DSN=&&A, DISP=(NEW, PASS) | <= G001 | |
| 2 | | //ST2 | EXEC PGM=TEST2 | | |
| 2 | 1 | //DD1 | DSN=&&B, DISP=(NEW, PASS) | <= G001 | — P001 |
| 3 | | //ST3 | EXEC PGM=TEST3 | | |
| 3 | 1 | //DD1 | DSN=&&A, DISP=(OLD, DELETE) | <= G001 | P001 |
| 4 | | //ST4 | EXEC PGM=TEST4 | | |
| 4 | 1 | //DD1 | DSN=&&B, DISP=(OLD, DELETE) | <= G001 | |
| 4 | 2 | //DD2 | DSN=Z, DISP=SHR | <= G002 | |
| 4 | 3 | //DD3 | DSN=&&C, DISP=(NEW, PASS) | | |
| 5 | | //ST5 | EXEC PGM=TEST5 | <= G002 | — P002 |
| 5 | 1 | //DD1 | DSN=&&C, DISP=(OLD,DELETE) | <= | P002 |
| 5 | 2 | //DD2 | DSN=&&D, DISP=(NEW, PASS) | <= | P003 |
| 6 | | //ST6 | EXEC PGM=TEST6 | | |
| 6 | 1 | //DD1 | DSN=&&D, DISP=(OLD, DELETE) | <= G002 | P003 |
| 7 | | //ST7 | EXEC PGM=TEST7 | | |
| 7 | 1 | //DD1 | DSN=Z, DISP=SHR | <= G002 | |
| | | // | | | |

FIG. 33

| JOB STEP NUMBER | DD NUMBER | | JCL | |
|---|---|---|---|---|
| 1 | | //TEST | JOB | |
| 1 | | //ST1 | EXEC | PGM=TEST1, PARAGRP=G001 |
| 1 | 1 | //DD1 | DO | DSN=Z,DISP=OLD |
| 1 | 2 | //DD2 | DO | DSN=&&P001, DISP=(NEW, PASS), UNIT=PIPE |
| 2 | | //ST2 | EXEC | PGM=TEST2, PARAGRP=G001 |
| 2 | 1 | //DD1 | DO | DSN=&&B, DISP=(NEW, PASS) |
| 3 | | //ST3 | EXEC | PGM=TEST3, PARAGRP=G001 |
| 3 | 1 | //DD1 | DO | DSN=&&P001, DISP=(OLD, DELETE) |
| 4 | | //ST4 | EXEC | PGM=TEST4, PARAGRP=G002 |
| 4 | 1 | //DD1 | DO | DSN=&&B, DISP=(OLD, DELETE) |
| 4 | 2 | //DD2 | DO | DSN=Z, DISP=SHR |
| 4 | 3 | //DD3 | DO | DSN=&&P001, DISP=(NEW, PASS) |
| 5 | | //ST5 | EXEC | PGM=TEST5, PARAGRP=G002 |
| 5 | 1 | //DD1 | DO | DSN=&&P001, DISP=(OLD,DELETE) |
| 5 | 2 | //DD2 | DO | DSN=&&P001, DISP=(NEW, PASS) |
| 6 | | //ST6 | EXEC | PGM=TEST6, PARAGRP=G002 |
| 6 | 1 | //DD1 | DO | DSN=&&P001, DISP=(OLD, DELETE) |
| 7 | | //ST7 | EXEC | PGM=TEST7, PARAGRP=G002 |
| 7 | 1 | //DD1 | DO | DSN=Z, DISP=SHR |
| | | // | | |

PARALLEL PROCESSING PROCEDURE SELECTING APPARATUS AND METHOD SELECTING AND IMPLEMENTING PARALLEL-EXECUTABLE PROCESSING PROCEDURES

BACKGROUND OF THE INVENTION

1. Field of the Invention

The present invention relates to an apparatus and a method for selecting processing procedures executable in parallel (hereinafter referred to as "job steps") by a computer. Whether the job steps are eligible to be executed in parallel is determined by inspecting a relationship between a data set and a processing procedure for processing procedure groups generated without consideration of whether the processing procedure group can be placed into a series of parallel processing procedure groups (a series of processing procedures are referred to as "a plurality of job steps of JCL" in the present invention). In determining whether a processing procedure group can be placed into a series of parallel processing procedure groups, data set(s) corresponding to each processing procedure group are inspected to determine whether the data set is an exclusively used data set and whether the data set is a pipelined (pipe) data set. Job steps eligible to be executed in parallel are referred to as parallel-executable job steps.

2. Description of the Related Art

Job steps described by JCL (Job Control Language) are instructions of procedures. The job steps are conventionally based on a premise that the job steps are respectively executed in the sequence in which the job steps are written. In a computer comprising a plurality of instruction executing and processing sections, system efficiency can be improved through parallel execution of the job steps if the job steps of each job are normal. Particularly when subsequent job steps input and process the data of a data set output from the preceding job steps, the data set is implemented as a pipe data set by reserving a virtual file in a system storage without directly utilizing an access storage device or a magnetic tape apparatus. A pipe data set is a transient data set transferred from one job step to another. Consequently, generating JCL for accurately executing in parallel the parallel-executable job steps from the relationship between the same pipe data sets designated by a plurality of job steps and between exclusively used data sets has been difficult.

SUMMARY OF THE INVENTION

The present invention is provided for determining which of a plurality of job steps described by JCL are executable in parallel, and for forming a plurality of parallel groups of job steps by checking the accessing conditions of each data sets (or files) used by the job steps.

An object of the present invention is to generate easily JCL for accurately executing in parallel parallel-executable job steps from the relationship between the same pipe data sets designated by a plurality of job steps.

Another object of the present invention is to select which pipe data sets allow job steps, described by JCL and accessing the pipe data sets, to be executed in parallel, by inspecting whether the data sets are pipe data sets and inspecting whether the data sets are exclusively used data sets, inspecting an application section of an applicable data set which is a pipe data set, and defining parallel groups of parallel-executable job steps based on results of the above-mentioned inspections.

Still another object of the present invention is to read JCL, inspect syntax of the JCL and an application method of the data set, then inspect parallelization of job steps, and present a JCL generating scheme to execute in parallel the job steps by editing and outputting a result of the job step parallelization.

A further object of the present invention is to read JCL, inspect syntax of the JCL and an application method of the data set, then inspect execution of job step parallelization and generate parallel job step JCL which enables parallel execution of job steps from a plurality of job steps of JCL.

An additional object of the present invention is to read JCL, inspect syntax of the JCL and the application method of the data set, and enable parallel execution of job steps with an output thereof.

Still a further object of the present invention is to analyze the accessing conditions to data sets used by programs, and select programs which can be processed in parallel based on the accessing conditions of the data sets, such as the disposition parameters of the data sets.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 13 is a diagram indicating an example of JCL of the plurality of job steps;

FIG. 14 is a diagram indicating a data set name list of data set Z;

FIG. 32 is a diagram indicating an example of an inspection result list of the present invention;

FIG. 33 is a diagram indicating an example of JCL for parallel job steps of the present invention;

DETAILED DESCRIPTION OF THE PRESENT INVENTION

Figure 1:
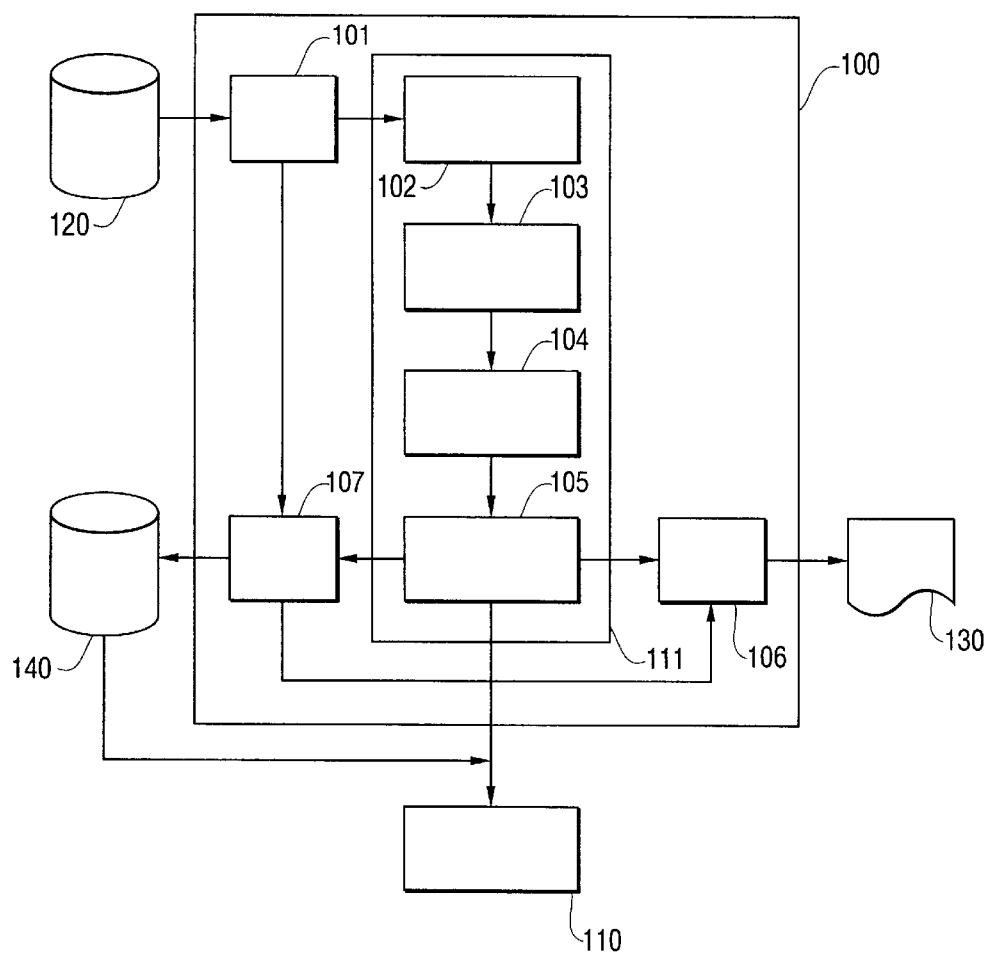
FIG. 1 is a structural diagram of the present invention.

The present invention is a parallel processing procedure selecting apparatus. The parallel processing procedure selecting apparatus of the present invention includes a parallelization inspecting apparatus selecting parallel-executable processing procedures by inspecting an application method of a data set of continuous processing procedures, a parallel executing apparatus, coupled to the parallelization inspecting apparatus, executing the parallel-executable processing procedures.

In addition, the parallelization inspecting apparatus of the parallel processing procedure selecting apparatus according of the present invention selects the parallel-executable processing procedures by determining whether the data set corresponding to a procedure is a pipe data set and by determining whether the data set corresponding to a procedure is an exclusively used data set.

Further, the parallelization inspecting apparatus of the parallel processing procedure selecting apparatus of the present invention enables parallel execution for the processing procedures, as a same processing procedure group, which are not in competition in a subsequent data set with the parallel-executable processing procedures, by determining whether the data sets used by the processing procedures are pipe data sets. The parallelization inspecting apparatus includes a processing procedure instruction analyzing section analyzing processing procedure instructions, a processing procedure reading section reading processing procedure instructions to designate a plurality of processing procedures, a list editing section outputting an edited inspection result list.

Also in the present invention, the parallel processing procedure selecting apparatus includes a processing procedure output section outputting processing procedure executing instructions required for execution of the parallel processing procedures on the basis of an inspection result from the processing procedure parallelization inspecting section. Further in the present invention, the parallelization execution processing section is provided for jobs to inspect each job step as the processing procedures. The parallel processing execution apparatus determines parallel execution for procedure groups selected on the basis of attributes of each procedure as a plurality of processing procedures.

In addition, the present invention is a parallel processing procedure selecting method determining whether processing procedures executed by a computer are executable in parallel. The method of the present invention includes the step of inspecting data sets and attributes used in each processing procedure among a plurality of processing procedures to select the parallel-executable processing procedures. One of the attributes of the data set is a pipe data set. Another of the attribute of the data set is an exclusively used data set.

In addition, the method of the present invention includes the steps of reading a processing procedure instruction having designated execution of a plurality of processing procedures, inspecting a data set and attribute thereof used in each of the plurality of processing procedures, selecting parallel-executable processing procedures, executing in parallel the processing procedures of which subsequent data sets are not in competition with each other as a same processing procedure group, and inspecting parallel execution for a procedure group selected on the basis of an attribute of each procedure as a plurality of processing procedures.

In the present invention, parallel-executable processing procedures are selected to generate the parallel-executable processing procedures, and to output a list of the parallel processing procedure names. In addition, in the present invention, a processing procedure designating a plurality of processing procedures is read and analyzed to select the parallel-executable processing procedures. The processing procedure designating a plurality of processing procedures is read directly for parallel execution.

In the present invention, computer processing units execute job steps which access data sets having file types and file attributes. Whether job steps are eligible to be executed in parallel by the processing units depends upon characteristics (such as the file attributes, etc.), and the DISP (disposition) parameter of the respective data sets. The DISP parameter is defined in the DD (data definition) statement of the data set.

The characteristics of the file (or data set), such as attributes, indicate whether the data set is an exclusively used data set (or exclusive use data set), a sequential data set, or a pipelined (or pipe) data set. The file type, for example, typically indicates that the file is one of a random access file and a sequential access file. If the file is a random access file, then the file is typically a write exclusive, read share file. If the file is a sequential access file, then the characteristic of whether the file is an exclusively used file or a shared file is determined based on the disposition parameter (DISP) of the file. Additional file attributes include Record Format (such as standard label/non-label\etc.), blocking length, and record length.

Accordingly, the present invention inspects the accessing conditions of each program to files, and selects programs which can be processed in parallel with each other based thereon. The accessing conditions include the file type and whether a pipe line data set is being accessed.

FIG. 1 is a structural diagram of the present invention, which overcomes the problems explained herein above. As shown in FIG. 1, a job step parallelization inspecting apparatus 100 comprises a parallelization inspecting section 111 newly disclosed by the present invention. The job step parallelization inspecting apparatus 100 of the present invention further comprises a JCL reading and analyzing section 101 which reads a plurality of job steps JCL 120 and provides the plurality of job steps JCL to the parallelization inspecting section 111 which executes inspection of parallel job steps.

Each structural element of the parallelization inspecting section 111 operates as follow. A data set name list generating section 102 generates a data set name list in regard to all data set names used in the JCL to be inspected.

A data set applicability inspecting section 103 selects data sets ensuring parallel-executable job steps within the parallel execution applicable section of the pipe data set partitioned by the exclusively used data set using the data set name lists. A data set list of non-applicable data sets is deleted.

A parallel executability inspecting section 104 determines whether job steps are parallel-executable in the application section of parallel-executable pipe data sets in the data set name list. A data set name list of the data sets having a non-parallel executable section for the corresponding job steps is deleted.

The parallel group deciding section 105 determines whether parallel-executable job steps can be grouped into the same parallel group based on the application section of data set to which the pipe data set can be applied from the data set name list.

A list editing section 106 edits the parallel-executable parallel groups for printing and edits an output of the JCL output for printing. The list editing section 106 outputs a JCL list 130.

A JCL output section 107 outputs a plurality of job steps JCL to the list editing section 106 or outputs parallel job steps JCL to an external file 140.

A parallel job step executing apparatus 110 shown in FIG. 1 executes job steps directly from an output of the parallel group deciding section 105 or by inputting an output of a file 140 for parallel job steps JCL.

In the present invention, a data set name list is generated from a plurality of job steps JCL. Also in the present invention, a data set name list of the data set to which the pipe data set cannot be applied is deleted based on the information about the data set application method, and the job step group information disabling parallel execution of the job steps using a data set indicated as being an exclusively used data set between job steps at the time of such deletion is updated. The data set enabling application of the pipe data set and the parallel group are decided based on the information in the section defined by the start and the termination of the application of the data sets remaining in the data set name list and the information of the job step group disabling the parallel execution of the job steps.

Moreover, in the present invention, when a plurality of job steps JCL are read, the syntax of the JCL and the application method of the data set are inspected, job step parallelization inspection is carried out by the job step parallelization inspecting method based on the above-mentioned inspection information. An inspection result list is edited and outputs based on the result of the foregoing inspection.

Moreover, in the present invention, a plurality of job steps JCL are read, the syntax of the JCL and the application method of the data set are inspected, the job step parallelization inspection is carried out by the job step parallelization inspecting method on the basis of the above-mentioned inspection information, and a plurality of input job steps JCL are modified based on the result of the foregoing inspection. The plurality of input job steps JCL are then converted to the output as parallel job steps JCL to which the parallel job step and pipe data set are applied.

In addition, in the present invention, a plurality of job steps JCL are read, the syntax of the JCL and the application method of the data set are inspected and the information required for execution of parallel job steps is generated to execute the jobs in parallel.

In a preferred embodiment of the present invention, each of the JCL reading and analyzing section 101, the data set name list generating section 102, the data set applicability inspecting section 103, the parallel executability inspecting section 104, the parallel group deciding section 105, the JCL output section 107, and the list editing section 106 are programs being executed by a computer.

Figure 2:
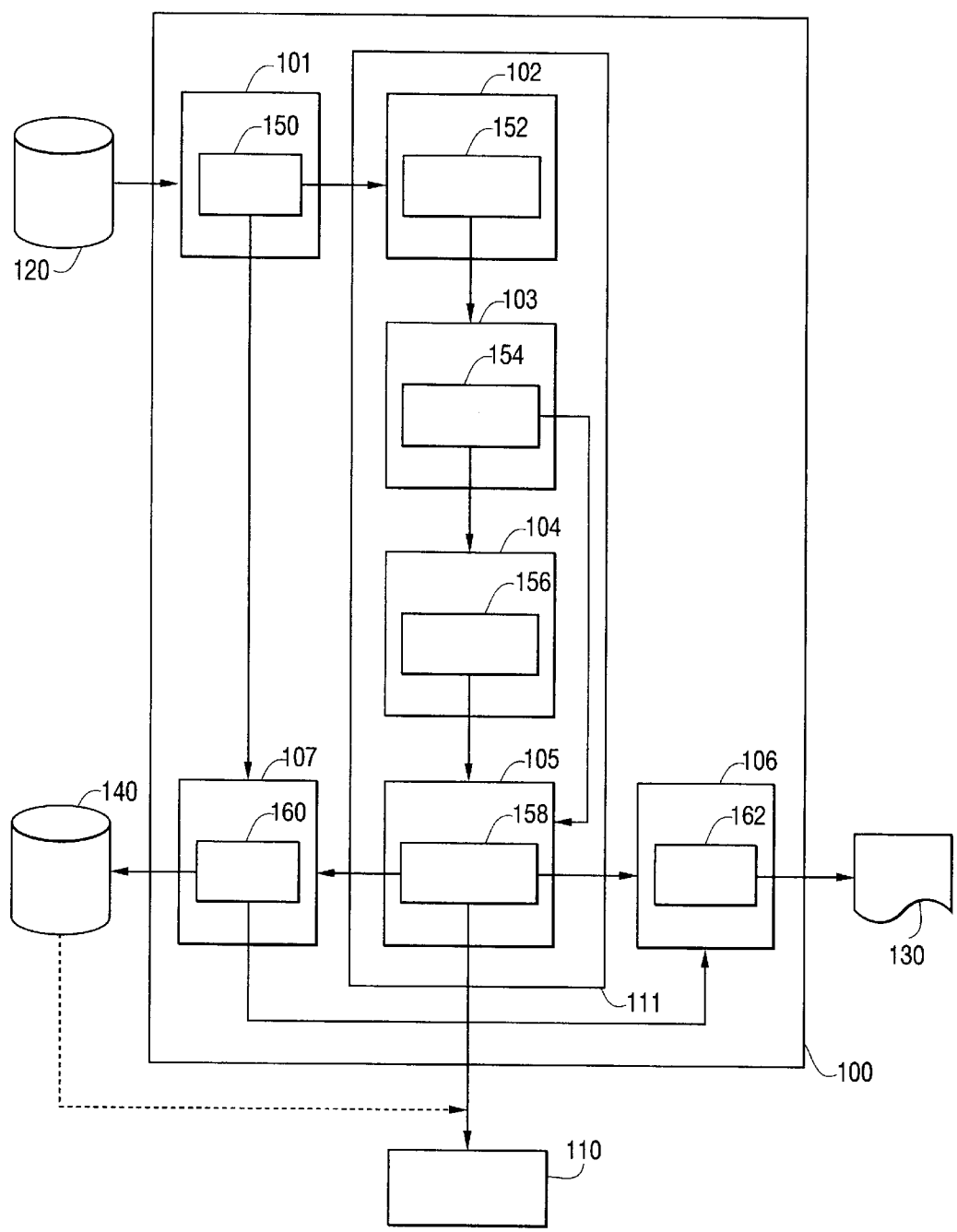
FIG. 2 is a structural diagram of the present invention showing output generated by the present invention.

FIG. 2 is a structural diagram of the present invention showing output generated by the present invention. As shown in FIG. 2, the JCL reading and analyzing section 101 outputs an input JCL stacker 150 to the data set name list generating section 102. The data set name list generating section 102 then outputs a data set name list 152 to the data set applicability inspecting section 103, which in turn outputs a job step matrix 154 to the parallel executability inspecting section 104 and to the parallel group deciding section 105. The parallel executability inspecting section 104 outputs a data set name list 156 to the parallel group deciding section 105, which in turn outputs a parallel group buffer 158 to one or all of the JCL output section 107, the parallel job executing apparatus 110, and the list editing section 106. The JCL output section outputs a parallel job step JCL stacker 160 to either or both of the external file 140 and the list editing section 106. The list editing section 106 outputs a JCL list stacker 162 to JCL list 130.

Figure 3:
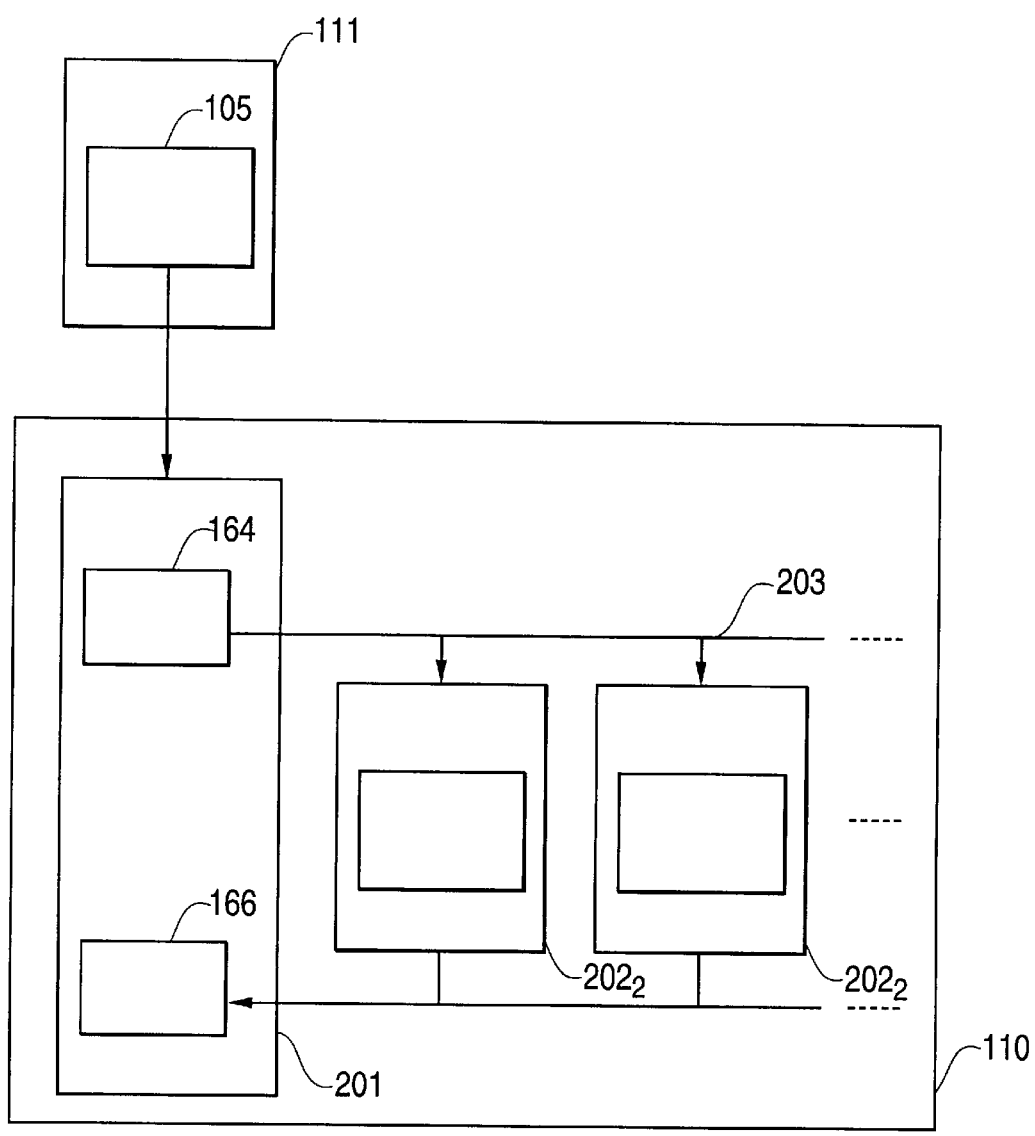
FIG. 3 is a structural diagram of the parallel job step executing apparatus shown in FIG. 1.

FIG. 3 is a detailed view of the parallel job step executing apparatus 110 shown in FIG. 1. As shown in FIG. 3, the parallel group deciding section 105 of the parallelization inspection section 111 of the present invention outputs job steps to be executed in parallel to a parallel executing controller 201 of apparatus 110. The parallel executing controller 201 then determines which job step executing processor $202_1$ to $202_n$ by which particular job steps are to be executed, and outputs the job steps accordingly through output buffer 164 to the corresponding job step executing processors $202_1 \ldots 202_n$ via bus 203. The job step executing processors $202_1 \ldots 202_n$ then execute the job steps in parallel. In a preferred embodiment of the present invention, the job step executing processors $202_1 \ldots 202_n$ comprise a number n of central processing units, as shown in FIG. 3. After completing executing the job steps, the job step executing processors $202_1 \ldots 202_n$ transmit via bus 204 the resulting data to input buffer 166 of the parallel executing controller 201. The parallel executing controller 201 then places the controller resultant data into groups.

Figure 4:
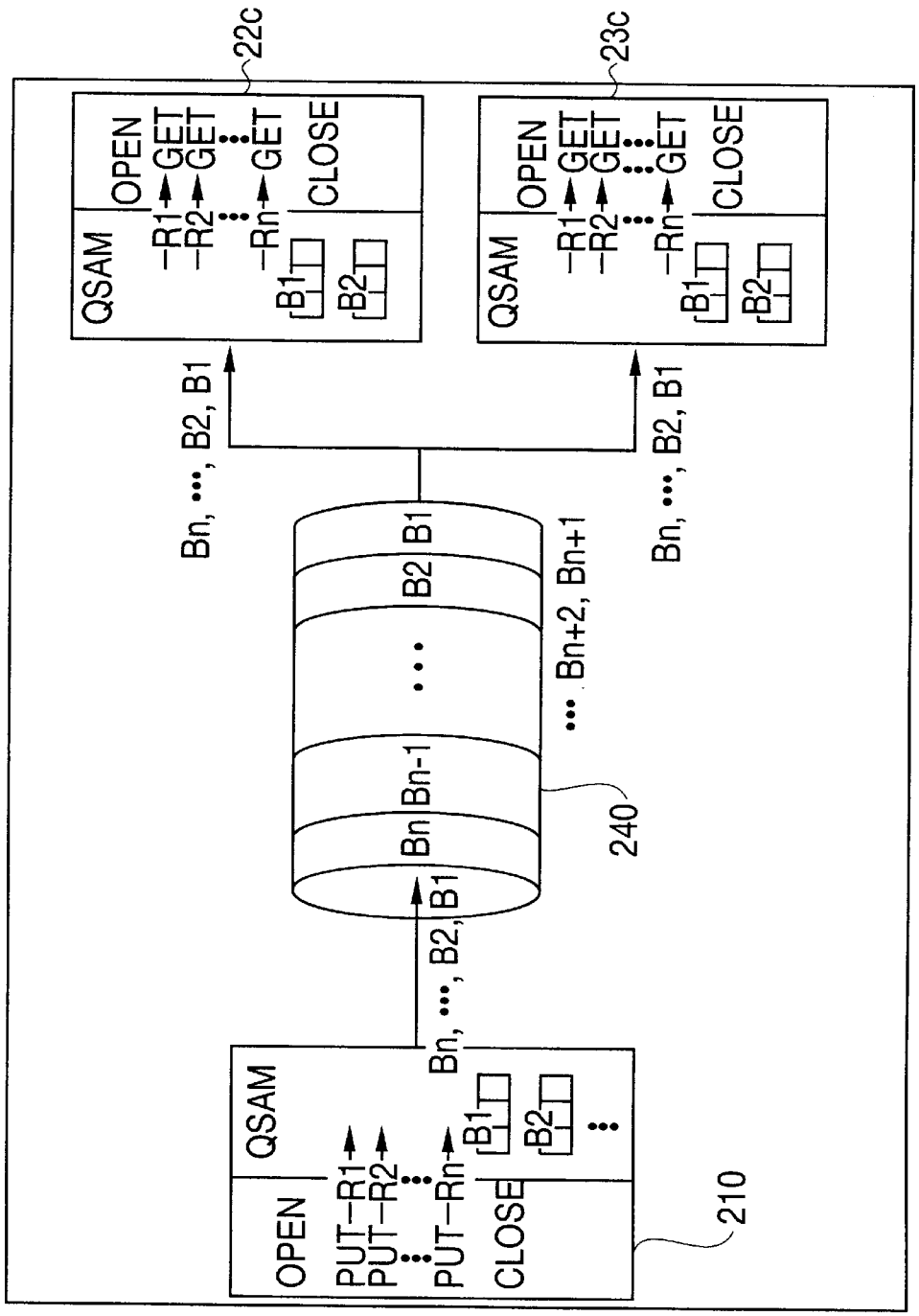
FIG. 4 is a explanatory diagram of a pipe data set and parallel job steps.

FIG. 4 is a diagram of an embodiment of the present invention. FIG. 4 shows data exchange between parallel job steps with a pipe data set. The pipe data set is a data set stored on a system storage unit (not shown in FIG. 4) and used for data exchange between job steps to be executed in parallel. Data generated and output by the job steps writing the data are immediately transferred to the job steps reading the data via the pipe data set. Since data in the pipe data set is deleted after the data is transferred to the job steps reading the data, even when a large amount of data is being transferred, the data can be processed only within a small region (65K bytes to several hundreds K bytes) of the system storage unit to use effectively the system storage unit.

As shown in FIG. 4, after a system storage file 240 storing the pipe data set in the system storage unit is opened, the access environment to the system file for the pipe data set is established. For example, the pipe data set is first opened in job steps 210 to 230 established based in input from a User (for example, when job step 220 is opened first). QSAM (queued sequential access method) is an example providing data management.

When a read operation (for example, job step 220) opens the system storage file first and starts the read operation but the write operation (i.e., job step 210) has not yet started or completed the write operation, the read operation waits for the write operation to complete. Job step 210 is referred to as the data write side (output side) of the pipe data set.

Data is written by write operations into the pipe data set in the sequence of B1, B2, B3, . . . , Bn, Bn+1, . . . (in units of block). Data is temporarily stored in the system storage file 240.

Job step 220 and job step 230, which read the data written by job step 210 in the system storage file 240 and are collectively referred to as the data read side (input side) of the pipe data set, read the data in the sequence of B1, B2, B3, . . . The same data are transferred to all job steps on the read side. When the same data has been read by all job steps on the read side, the region in the system storage file 240 accumulating such data is released. The region in the system storage file is used cyclically.

When the pipe data set is full of the data accumulated during data write operations, the job steps on the write side are in the waiting condition until the read side reads the data in the pipe data sets, to generate vacant pipe data sets. Moreover, when there is no data in the pipe data sets during a data read operation, the job steps on the read side are in the waiting condition until the job steps on the write side write data.

With the read and write operations explained herein above, data exchange can be executed between the write side (job step 210) and read side (job steps 220 and 230) through asynchronous parallel execution.

Table 1 shows designation of DISP (disposition) parameters which are considered as exclusive use of the data set. Exclusive use of the data set is determined based on the DISP parameters designated by the DD statement in the JCL. Designation of DISP parameters which are considered exclusive use of data set are explained herein below.

TABLE 1

Designation of DISP Parameter Considered
Exclusive Use of Data Set

| Item No. | 1st Parameter | 2nd Parameter | 3rd Parameter |
|---|---|---|---|
| 1 | NEW | Option | Option |
| 2 | OLD | Option | Option |
| 3 | SHR | DELETE | Option |
| 4 | SHR | Option | DELETE |

When the DISP parameters are not designated in the DD statement, the DISP parameters are considered to have the designation of DISP=(NEW, DELETE, DELETE). The first parameter on the right side indicates the first state for reserving the data set (NEW means new generation, OLD means existence, and SHR means common read operation), the second parameter indicates the processing of the data set for normal termination (KEEP means storage, PASS means application of subsequent job steps, DELETE means deletion) and the third parameter indicates the processing of the data set for defective termination (same as the second parameter).

Whether the data set is an exclusive use data set is determined by the first parameter, and does not depend on the second parameter.

The data set name list generating section 102 of FIG. 1 prepares a data set name list regarding all data sets used in the JCL to be inspected and a list of data set name lists coupling data set name lists.

Figure 5:
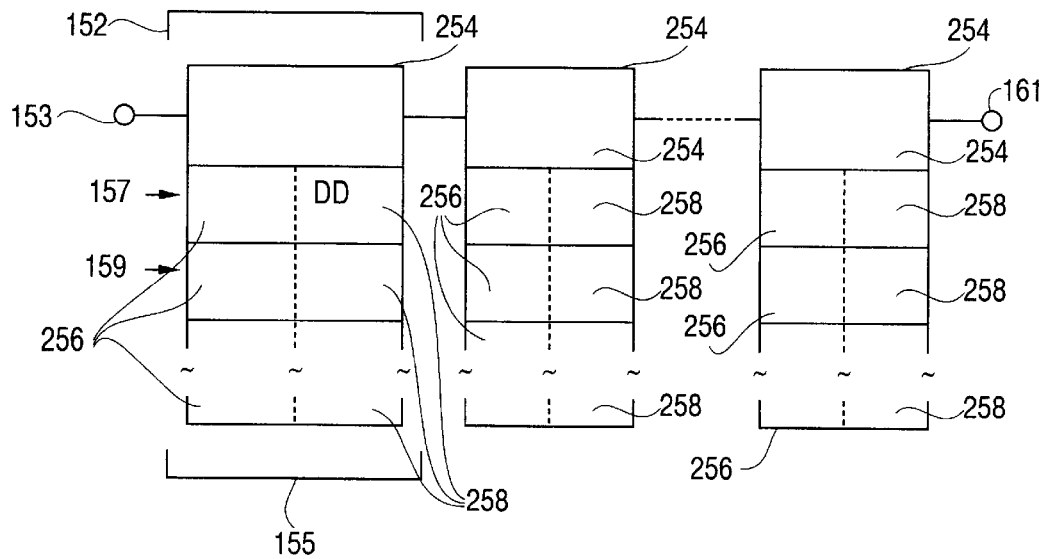
FIG. 5 is a list of data set name lists of the present invention.

FIG. 5 shows a list of data set name lists 152. The data set name list 152 includes, as shown in FIG. 5, a heading 153, a data set name (shown in section 254), a job step number (shown in section 256) using the data set and an entry for storing the DD statement number (shown in section 258). As for the entry number in section 258, only one or a plurality numbers are used. The data set name list comprises a plurality of data set name lists 155. A first entry is indicated by 157, and a second entry is indicated by 159. The termination 161 of the data set name list 152 is also shown in FIG. 5.

In one data set name list, entries are arranged to provide an ascending sequence of the job step numbers. Moreover, the data set name lists are arranged to provide an ascending sequence of the job step numbers of the heading entries or of the DD statement numbers when the job step numbers are equal.

The data set applicability inspecting section 103 of FIG. 1 deletes a data set name list to which the pipe data set is not applicable for the data sets listed in the data set name list, and registers a set of the job step numbers exclusively using such data sets to the job step matrix as the group of the job steps which cannot be executed in parallel.

Figure 6:
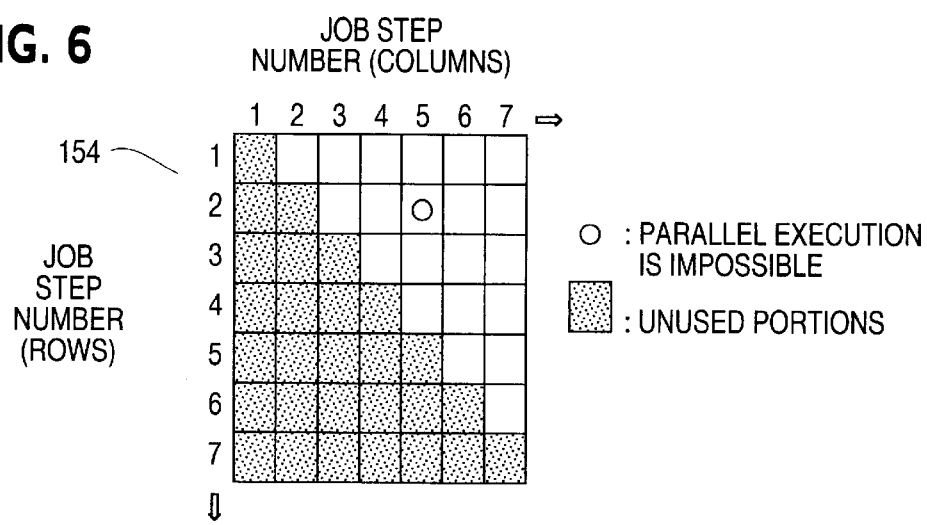
FIG. 6 is a diagram of a job step matrix of the present invention.

The job step matrix 154 arranges the job step numbers in rows and columns, as shown in FIG. 6, in which a set of job steps which cannot be executed in parallel is indicated by 0. The example of FIG. 6 indicates parallel execution is impossible for a combination of job step numbers 2 and 5. In the job step matrix of FIG. 6, parallel execution is possible for all job steps in the initial condition.

The parallel executability inspecting section 104 of FIG. 1 determines whether the job steps are executable in parallel in the application section of the data sets in the data set name list by referring to the job step matrix. The parallel executability inspecting section 104 deletes, if parallel execution is impossible, the data set name list from a list of the data set name lists.

Figure 7:
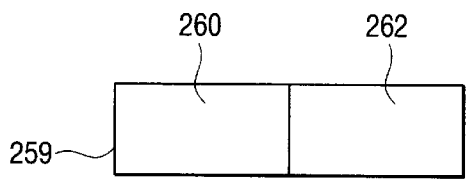
FIG. 7 is a diagram of the parallel execution essential section of the present invention.

When parallel execution is possible, the section of the data set name list combining the parallel execution essential section 259, which includes the heading job step number 260 and termination job step number 262 as shown in FIG. 7, and the application section is inspected to determine whether parallel execution is possible. When parallel execution is possible, the parallel execution essential 259 section is updated. When parallel execution is impossible, the data set name listed is deleted.

In the case of deleting the data set name list, exclusive use of the data set is inspected and a set of the job steps exclusively used is registered in the job step matrix shown in FIG. 6.

The parallel group deciding section 105 shown in FIG. 1 determines whether the job steps, not belonging to the application section of the data set to which the pipe data set in the data set name list is applicable and the application section of the data set to which any pipe data set can be applied, are parallel executable.

The parallel group deciding section 105 prepares a parallel group list to decide sets of the job steps which can operate as the same parallel group.

Figure 8:
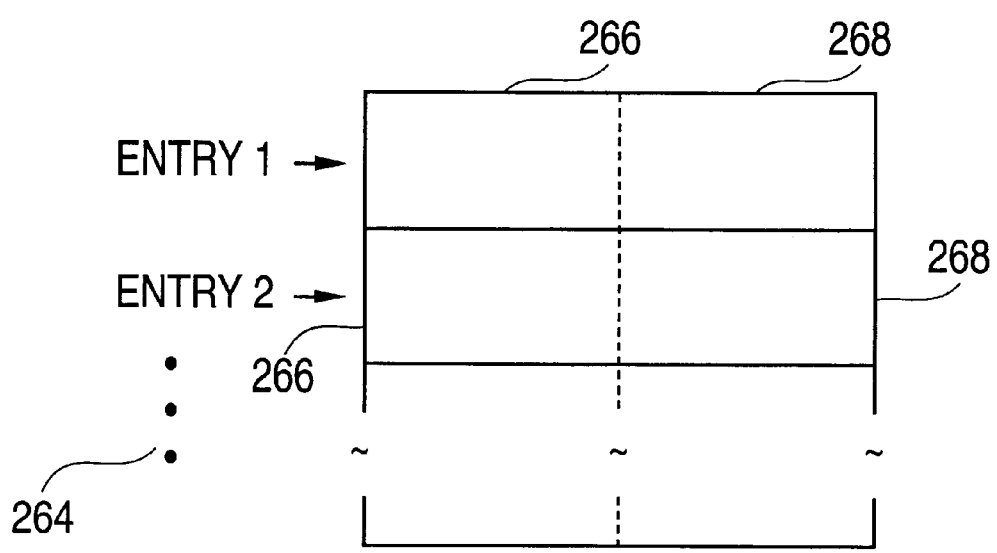
FIG. 8 is a diagram of a parallel group list of the present invention.

A parallel group list 264 has a plurality of entries each of which includes a parallel group heading number 266 and a parallel group termination number 268, as shown in FIG. 8. The job steps in the section indicated by one entry can operate as the same parallel group.

FIG. 9 to FIG. 12 show detailed flowcharts indicating how the data is actually exchanged, thereby showing the sequence in the job step parallelization inspection. FIG. 13 shows an example of the JCL which is being inspected using the flowcharts shown in FIG. 9 to FIG. 12. In addition in FIG. 9 to FIG. 12, reference is made to FIG. 14 Data Set Name List, FIG. 15 Condition and Arrangement of List of Data Set Name Lists when List of Data Set Name Lists is Generated, FIG. 16 Job Step Matrix, FIG. 17 List of Data Set Name Lists, FIG. 18 to FIG. 19 Parallel Execution Essential Section, FIG. 20 Data Set Name List, FIG. 21 Job Step Matrix, FIG. 22 Parallel Execution Essential Section, FIG. 23 to FIG. 30 Parallel Group Lists and FIG. 31 List of Data Set Name Lists. Moreover, a job step referred to herein below is each flow structure step shown in FIG. 9 to FIG. 12 and is different from job step referred to herein above.

In an example of the JCL which is an inspection object in FIG. 13, a data set Z is defined with DD statement number 1 of job step number 1, DD statement number 2 of job step number 4 and DD statement number 1 of job step number 7.

Figure 9:
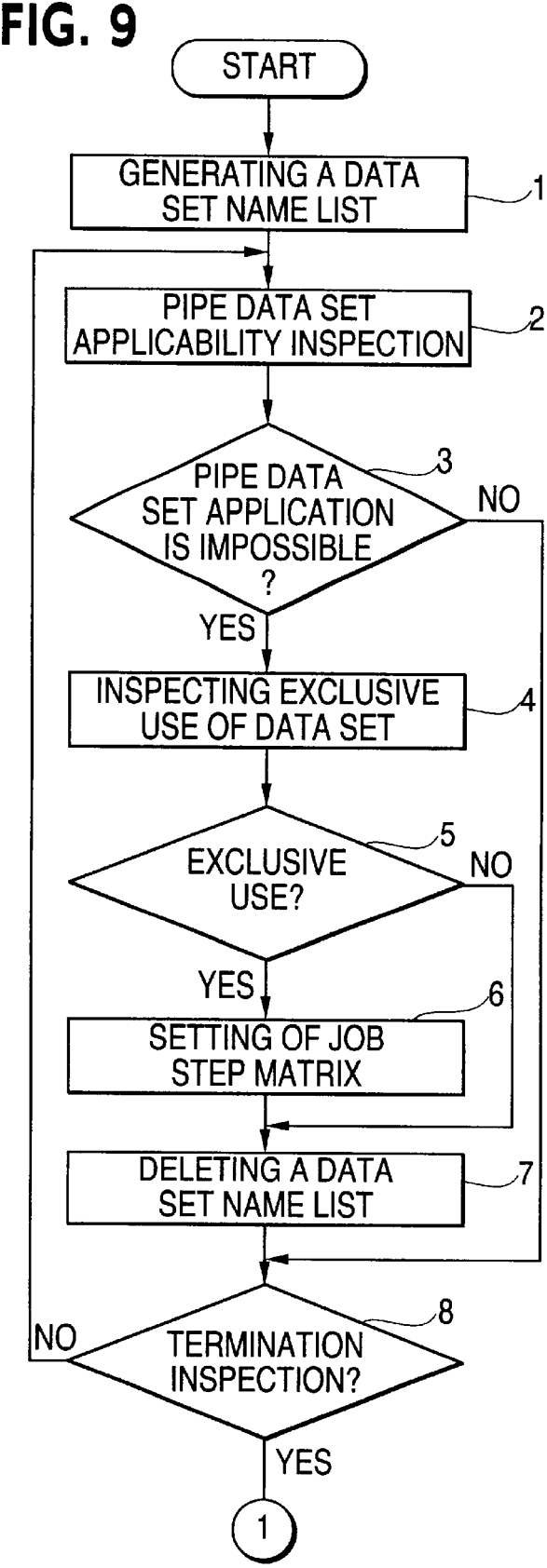
FIG. 9 is a structural flowchart (No. 1) of the present invention.

FIG. 9 is structural flowchart (No. 1) of the present invention. In step 1 (of FIG. 9 to FIG. 12), a data set used from the heading part of the JCL is searched to generate a data set name list 152 of data set Z, as shown in FIG. 14.

Figure 15:
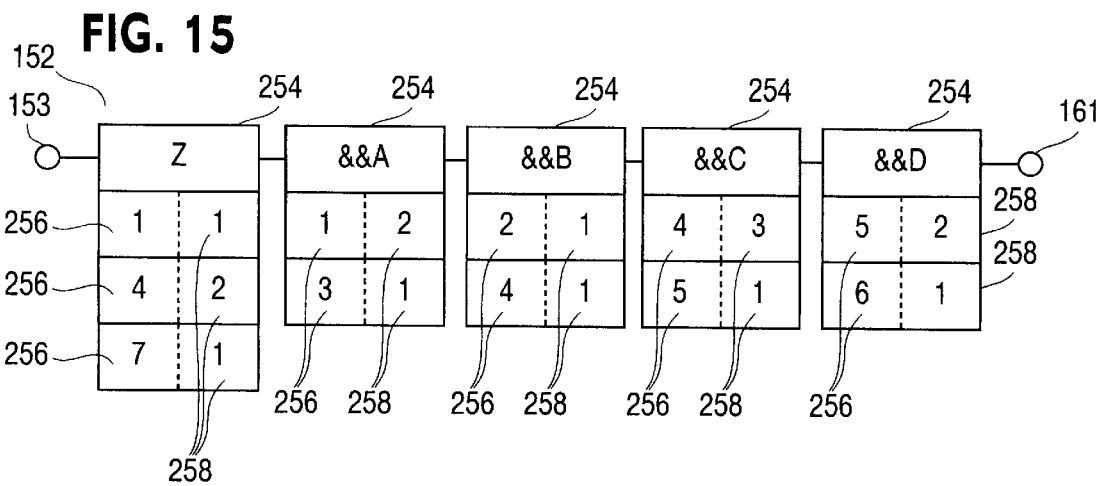
FIG. 15 is a diagram indicating a list of the data set name lists.

In the same manner, a data set name list is generated for data sets &&A, &&B, &&C and &&D of FIG. 13. In the data set name list, the heading entries are sequentially arranged from the smaller job step numbers or from the smaller DD statement numbers when the job step number is equal. Generation of the data set name list is then terminated. The list of data set name lists 152 and arrangement thereof at this time are indicated in FIG. 15 Condition and Arrangement of List of Data Set Name Lists when List of Data Set Name Lists is Generated.

In step 2 shown in FIG. 9, the pipe data set applicability inspection is performed for data set Z in the heading data set name list. In step 2, the pipe data set applicability is disabled under the conditions that data set is defined only with one DD statement in the job, a new data set is not generated, and the data sets of the same name are defined with a plurality of DD statements in one job step.

Also in step 2, data set Z is determined to disable application of the pipe data set because DISP=OLD or SHR is defined in the DD statements of job step numbers 1, 4, 7 and a new data set is not generated. In this case, pipe data set application is impossible, and the "YES" path is taken in step 3 of FIG. 9.

In the data set exclusive use inspection of step 4, inspection occurs of whether exclusive use of the data set is designated or not with the DD statement indicated for each entry of the data set name list. Data set Z is determined to be an exclusive use data set because DISP=OLD is designated in the DD statement of job step number 1, indicated by the heading entry. Therefore, the "YES" path is selected in step 5 of FIG. 9.

In establishing the job step matrix in step 6 of FIG. 9, all sets of the exclusively used job step numbers and the other job step numbers in the same data set name list are indicated in the job step matrix as the sets of the job steps which are not executed in parallel. In the case of data set Z, the foregoing is indicated as a set of the job step number 1 and another number. A set of job step numbers 1 and 4 and a set of job step numbers 1 and 7 are established as the sets of the job steps which are not executed in parallel.

Since the set of job step numbers (for example) 2 and 4 and the set of the job step numbers 4 and 2 have the same meaning, when the job step numbers are established in the job step matrix, the smaller job step number is established in the row of the job step matrix, while the larger job step number is established in the column of the job step matrix. Therefore, the dotted areas of the job step matrix 154 shown in FIG. 16 are the unused portions.

Figure 16:
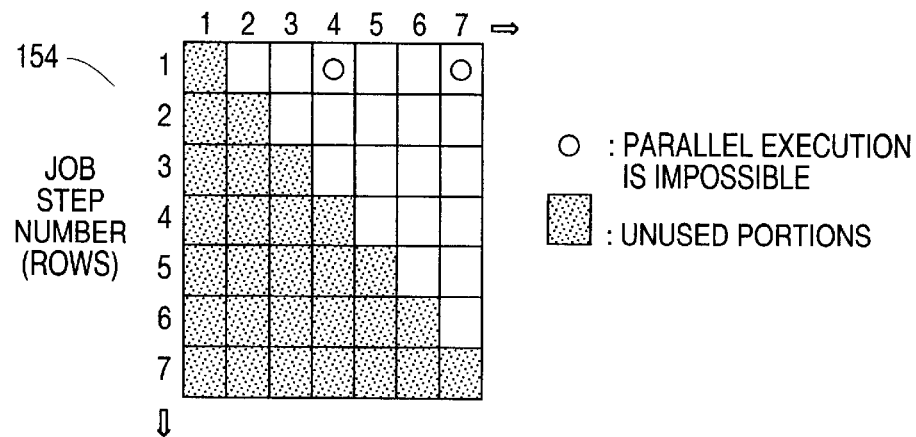
FIG. 16 is a diagram indicating a job step matrix.

As shown in FIG. 16 in the job step matrix at this time, the mark indicating impossibility of parallel execution is added to the positions of job steps 4 and 7 of the rows for job step 1.

In step 7 of FIG. 9, data set Z is deleted from the list of data set name lists because the pipe data set cannot be applied to the data set name list for data set Z. Inspection for exclusive use of the data sets between steps has been completed.

In the inspection for termination in step 8 of FIG. 9, if inspection for all data set name lists is not yet completed "NO" in the step 8), inspection for the application of the pipe data set is carried out subsequently for data set &&A. Data set &&A does not apply to the conditions for disabling application of the pipe data set "NO" in step 3 of FIG. 9). In the same manner, inspection for pipe data set application is performed sequentially for data sets &&B, &&C and &&D. Since the above-mentioned conditions for disabling application of the pipe data set do not apply to data sets &&B, &&C, and &&D, application of the pipe data set is possible for the foregoing data sets.

Figure 17:
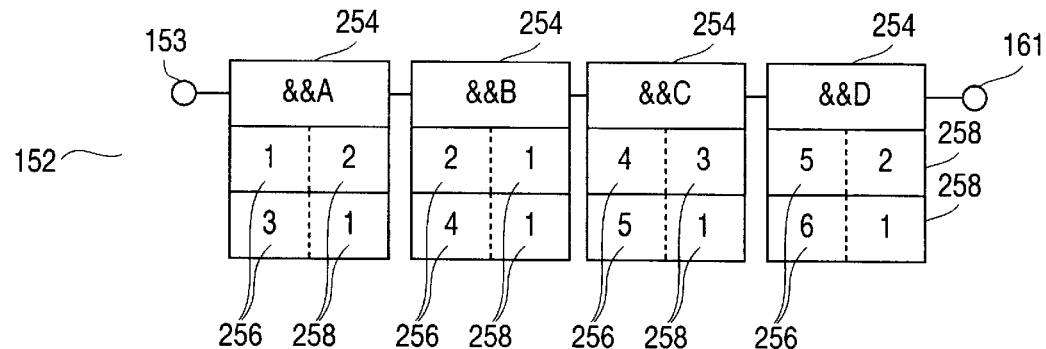
FIG. 17 is a diagram indicating a list of data set name lists.

The data set name list and arrangement thereof at this point are indicated in the list of the data set name lists 152 shown in FIG. 17. The condition of the job step matrix of FIG. 16 does not change because there is no data set other than the data set Z disabling application of the pipe data set.

Figure 10:
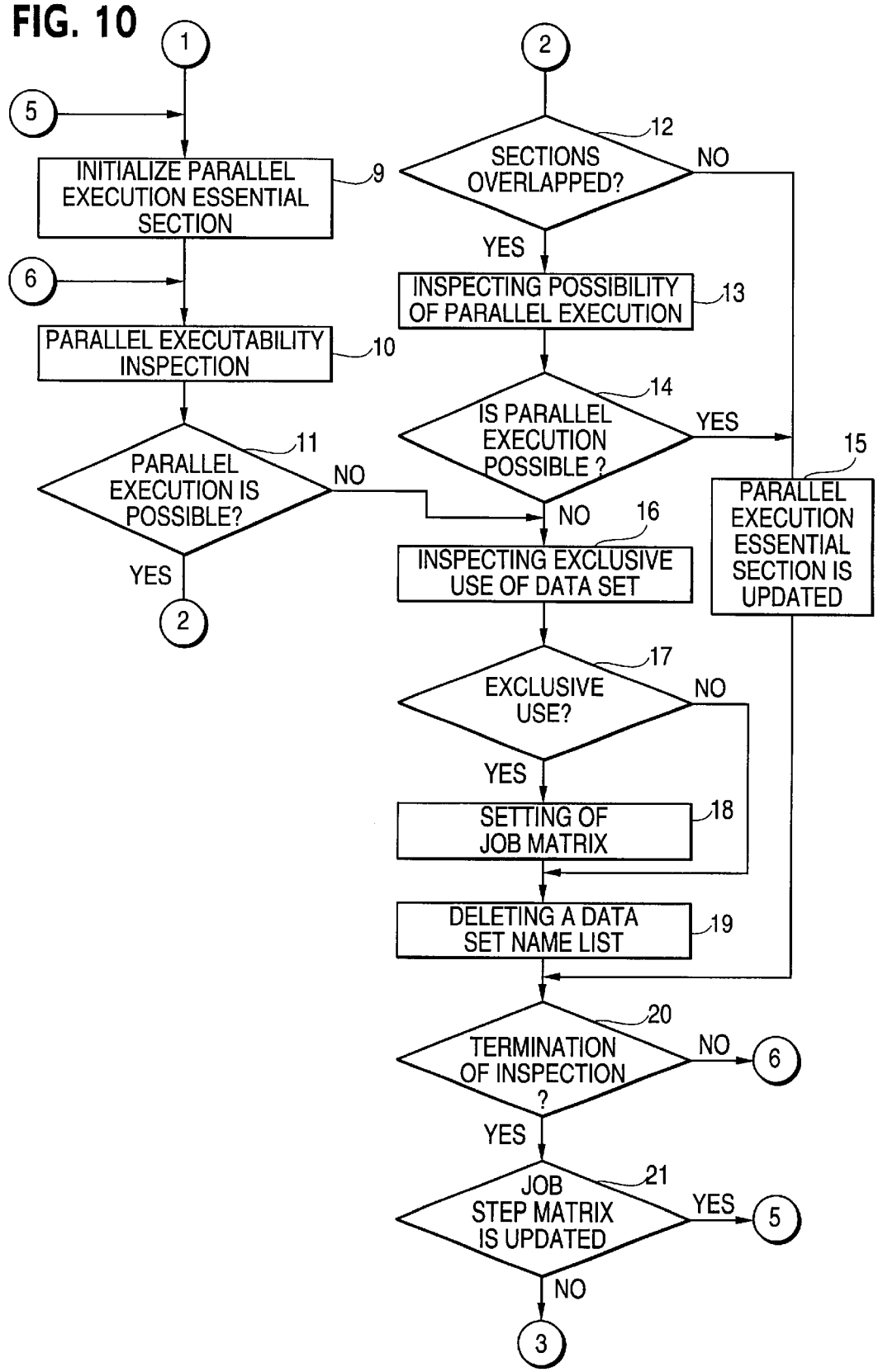
FIG. 10 is a structural flowchart (No. 2) of the present invention.

When inspection is terminated for all data set name lists in step 8 of FIG. 9, the parallel execution essential section is initialized as shown in step 9 of FIG. 10. FIG. 10 is structural flowchart (No. 2) of the present invention. In the parallel execution essential section 259 at the time of initialization, both of the heading job step number 260 and termination job step number 262 have the values of the first job step, as shown in the parallel execution essential 259 section of FIG. 18.

In the parallel executability inspection of step 10, it is inspected whether job steps in the section are parallel-executable or not in the application section of the data set &&A. Since the application section of the data set &&A is defined by job step numbers 1 and 3 (defined as application section (1, 3) from the job step numbers of the heading entry and the final entry of the data set name lists, when the parallel execution is possible for all sets of the job step numbers 1 and 2, 1 and 3, 2 and 3 in the job step matrix, parallel execution is possible for the job step in the application section (1, 3) of data set &&A.

In this case, all job steps are determined to be parallel-executable in the application section of data set &&A "YES" in step 11).

Moreover, since the parallel execution essential section is defined as (1, 1) and the application section of data set &&A is defined as (1, 3), the sections are determined to be overlapped "YES" in step 12 of FIG. 10).

In step 13 of FIG. 10, whether parallel execution is possible for all job steps in a section established when the overlapped sections are combined to one section is inspected. Since the parallel execution essential section (1, 1) is included in the application section (1, 3), parallel execution is possible for the job steps in the section combining two sections "YES" in step 14 of FIG. 10).

Figure 19:
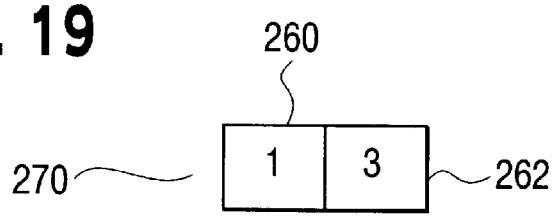
FIG. 19 is another diagram of the parallel execution essential section of the present invention.

In step 15 of FIG. 10, the parallel execution essential section is updated. The termination job step number 1 of the parallel execution essential section is compared with the termination job step number 3 of the data set application section, and the termination job step number of the parallel execution essential section is set to the larger number, 3. The condition of the parallel execution essential section 270 at this time is shown in FIG. 19.

In step 20 of FIG. 10, since inspection for the data sets &&B, &&C, &&D has not yet completed "NO" in step 20), the sequence returns to step 10 to execute inspection for parallel execution of the next data set, &&B.

Since inspection of the job step matrix 154 of FIG. 16 in the same manner as the inspection of data set &&A indicates that job step numbers 2 and 3, 2 and 4, 3 and 4 are parallel-executable, all job steps are parallel-executable (steps 10 and 11 of FIG. 10) in the application section (2, 4) of the data set &&B. Moreover, since the job steps are overlapped in the parallel execution essential section (1, 3) and application section (2, 4) "YES" in the step 12 of FIG. 10), in step 13 whether all job steps are parallel-executable in section (1, 4) combining the foregoing two sections is inspected. However, since parallel execution is disabled for job step numbers 1 and 4 in the job step matrix 154 of FIG. 16 "NO" in step 14 of FIG. 10), inspection is carried out for the exclusive use of data set &&B in step 16 of FIG. 10.

In step 17 of FIG. 10, since data set &&B is exclusively used (DISP=NEW or OLD) in job step numbers 2 and 4 of FIG. 13 "YES" in step 17 of FIG. 10), then in step 18 a set of job step number exclusively used and all other job step numbers in the data set name list (i.e., the set of the job step numbers 2 and 4) is registered as the job step disabling parallel execution in the job step matrix 154, and the data set name list of the data set &&B is deleted from the list of the data set name lists in step 19.

Figure 20:
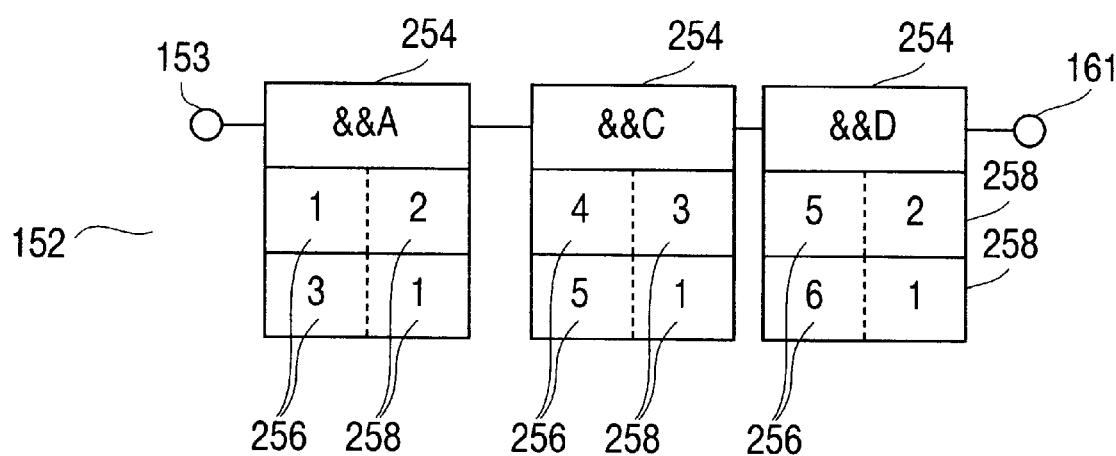
FIG. 20 is a diagram of a list of the data set name lists.
Figure 21:
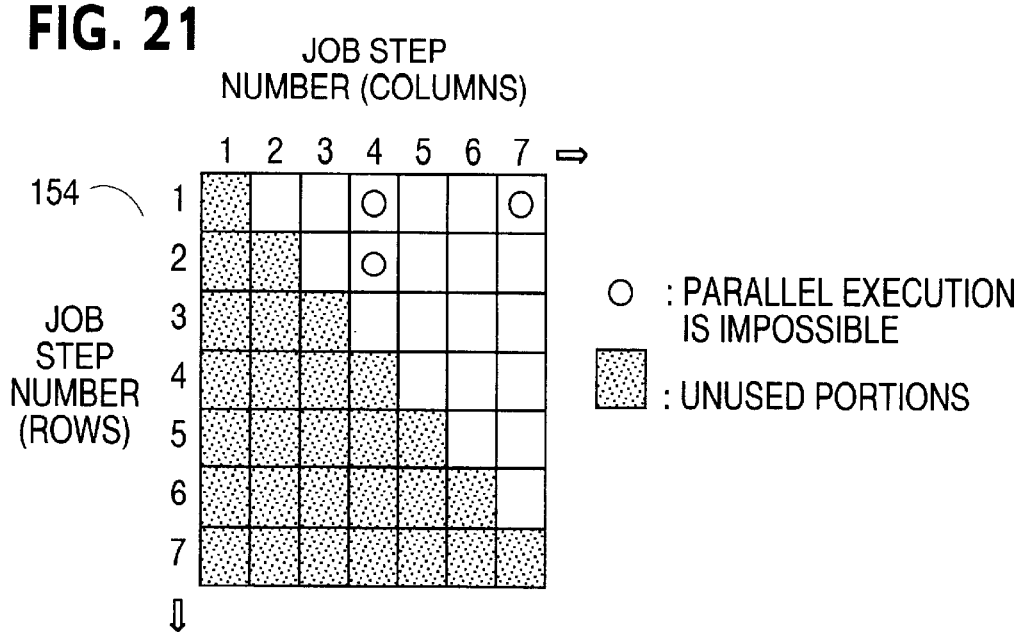
FIG. 21 is a diagram of a job step matrix.

A list of the data set name lists 152 at this time is shown in FIG. 20. The condition of the job step matrix is shown in FIG. 21. The parallel execution essential section of FIG. 19 is not changed.

Since inspection of data sets &&C and &&D is not yet completed "NO" in step 20 of FIG. 10), the processing of step 10 and subsequent steps are executed for the next data set &&C.

As shown in the job step matrix 154 of FIG. 21, since job steps numbers 4 and 5 are executable in parallel, all job steps are parallel-executable in the application section (4, 5) of data set &&C "YES" in step 11) and the job steps do not overlap in the parallel execution essential section (1, 3) and the application section (4, 5) "NO" in step 12). Therefore, the application section is defined as the new parallel execution essential section (step 15).

Figure 22:
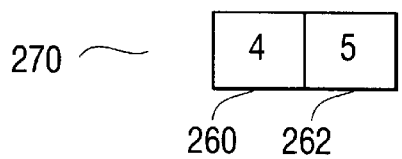
FIG. 22 is an additional diagram of the parallel execution essential section of the present invention.

The parallel execution essential section at this time is shown in FIG. 22.

Since the inspection for data set &&D is not yet completed "NO" in step 20), the processing of step 10 and subsequent steps are executed for data set &&D.

Since it can be understood from the job step matrix of FIG. 21 that both job step numbers 5 and 6 are parallel-executable, all job steps are parallel-executable in the application section (5, 6) of data set &&D "YES" in step 11).

Since the job steps are overlapped in the parallel execution essential section (4, 5) and the application section (5, 6) "YES" in the step 12), the job step matrix is inspected to determine whether all job steps are parallel-executable in section (4, 6) combining such two sections. Since parallel-execution is possible for job step numbers 4 and 5, 4 and 6, 5 and 6, all job steps are parallel-executable in section (4, 6) "YES" in step 14) and the termination job step number in the parallel execution essential section is updated to 6 (step 15).

Since all data set name lists have now been inspected "YES" in the step 20), whether the job step matrix has been established in step 18 is inspected. Since the job step matrix is updated at the time of inspecting data set &&B "YES" in step 21), the processing of step 9 and subsequent steps are executed again.

Figure 18:
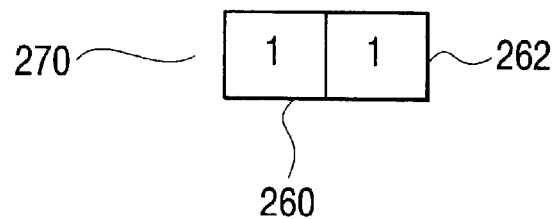
FIG. 18 is a diagram of the parallel execution essential section of the present invention.

A data set name list after the initialization of the parallel execution essential section of step 9 is shown in FIG. 20, the job step matrix is shown in FIG. 21 and the parallel execution essential section is shown in FIG. 18.

Figure 11:
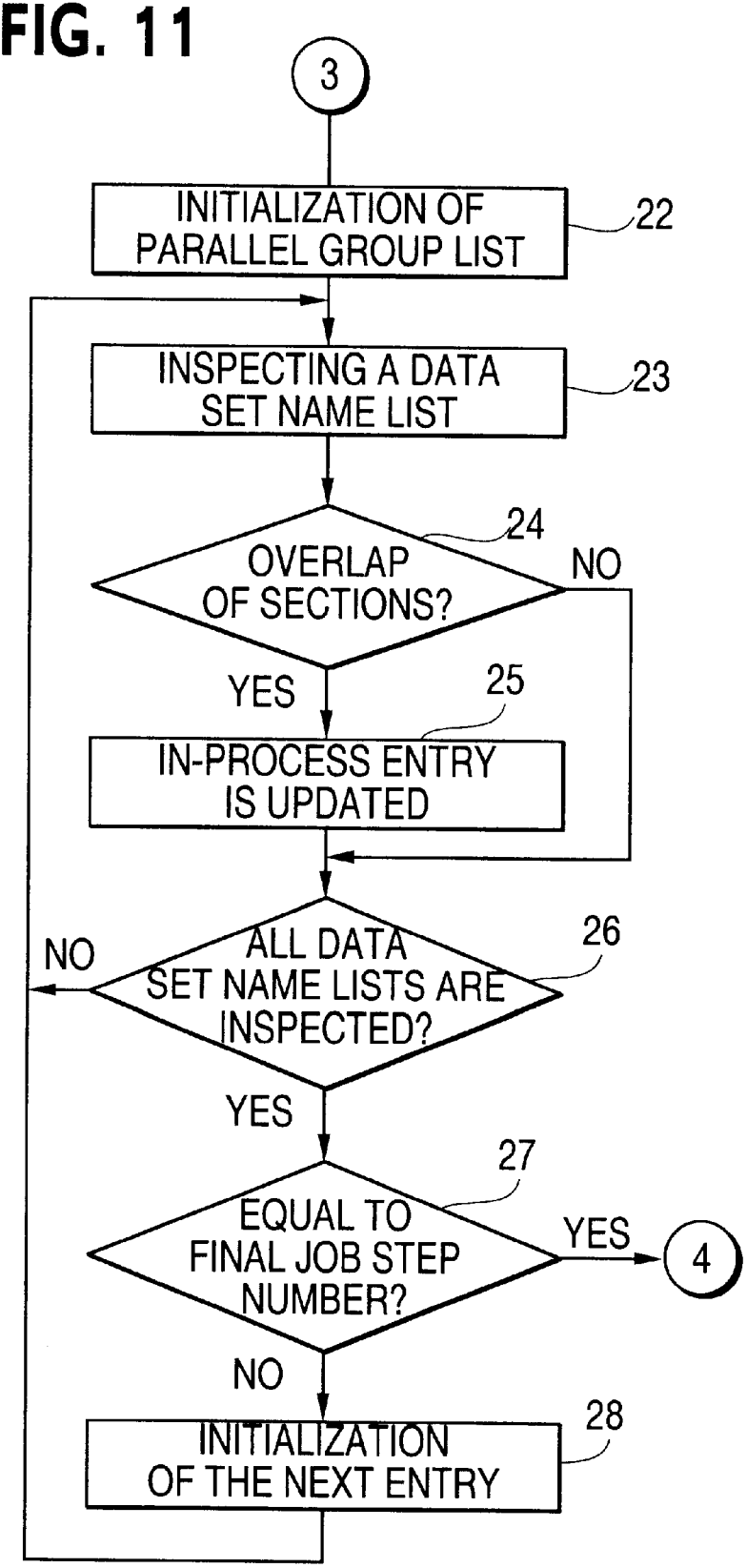
FIG. 11 is a structural flowchart (No. 3) of the present invention.

When processing of steps 10 to 20 are executed for all remaining data set name lists (&&A, &&C, and &&D), processing is terminated in step 20 without updating the data set name lists to be deleted or the job step matrix "NO" in step 21) and the sequence shifts to processing of step 22 of FIG. 11 and subsequent steps.

Figure 23:
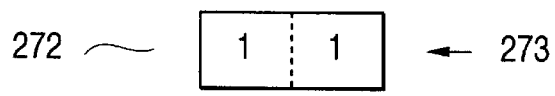
FIG. 23 is a diagram of a parallel group list of the present invention.

FIG. 11 is structural flowchart (No. 3) of the present invention. In step 22 of FIG. 11, the parallel group list is initialized for an in-process entry. The condition of the parallel group list 272 at this time is shown in FIG. 23, with the in-process entry shown as 273.

The data set name list of data set &&A is inspected. Whether the application section of the data set overlaps with the group section indicated by the in-process entry is also inspected (step 23 of FIG. 11).

Figure 24:
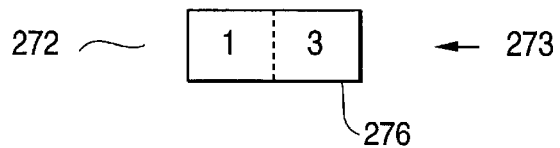
FIG. 24 is a diagram of another parallel group list of the present invention.

Since the job steps overlap in the application section (1, 3) of the data set and the group section (1, 1) "YES" in step 24 of FIG. 11) , the parallel group termination number (shown in section 276) of the in-process entry is updated by the termination job step number in the application section of the data set. The condition of the parallel group list at this point is shown in FIG. 24, with the in-process entry shown as 273.

Figure 25:
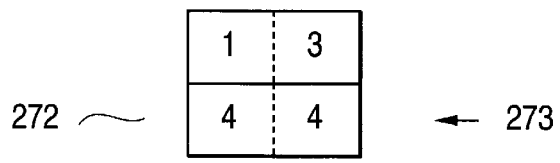
FIG. 25 is a diagram of a further parallel group list of the present invention.

Since the data set name lists have not all been inspected "NO" in step 26 of FIG. 11), the remaining data set name lists are inspected. Since the job steps do not overlap between the application section (4, 5) and the group section (1, 3) for data set &&B, and between the application section (5, 6) and the group section (1, 3) for data set &&C "NO" in the step 24) , the in-process entry is not updated. Since all data set name lists have now been inspected "YES" in step 26), whether the parallel group termination number of the in-process entry is equal to the final job step number is inspected. Since the final job step number is 7, which is not equal to the parallel group termination number "NO" in step 27 of FIG. 11), the next entry is initialized with the value which is equal to the parallel group termination number of the in-process entry+1 to provide the next entry as the in-process entry (step 28 of FIG. 11). The condition of the parallel group list 272 at this time is shown in FIG. 25, with the in-process entry shown as 273.

Figure 26:
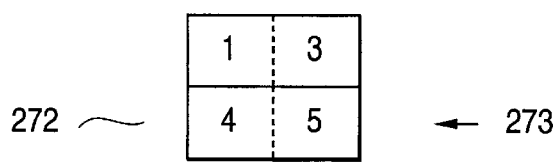
FIG. 26 is a diagram of another parallel group list of the present invention.

Steps 23 to 26 are executed again for all data set name lists. The job steps do not overlap between the application section (1, 3) of data set &&A and the group section (4, 4) of the in-process entry but the job steps overlap between the application section (4, 5) of data set &&B and the group section (4, 4) of the in-process entry. Therefore, the in-process entry is updated. The condition of the parallel group list 272 after renewal is shown in FIG. 26, with the in-process entry shown as 273.

Figure 27:
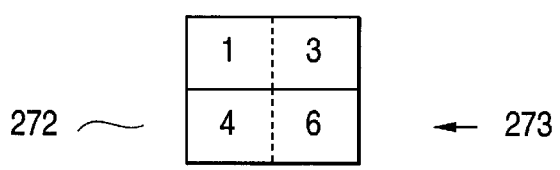
FIG. 27 is a diagram of still another parallel group list of the present invention.

Since the application section (5, 6) of the data set &&C overlaps with the group section (4, 5) of the in-process entry, the in-process entry is updated. The parallel group list 272 after the renewal is shown in FIG. 27, with the in-process entry shown as 273.

Figure 28:
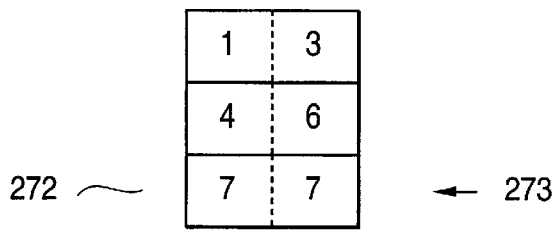
FIG. 28 is a diagram of a still further parallel group list of the present invention.

Since all data set name lists are inspected but the parallel group termination number of the in-process entry is not equal to the final job step number 7, the next entry is initialized with a value which is equal to the parallel group termination number of in-process entry+1 to provide the next entry as the in-process entry. The condition of the parallel group list at this time is shown in FIG. 28, with the in-process entry shown as 273.

Figure 29:
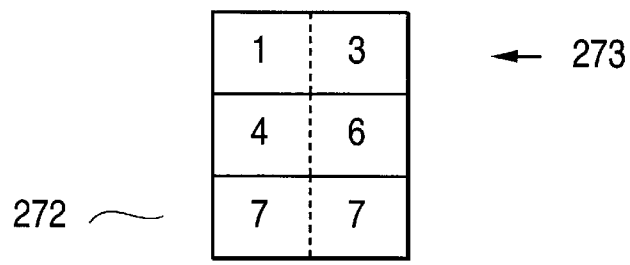
FIG. 29 is a diagram of another parallel group list of the present invention.

The processing from steps 23 to 26 is executed again for all data set name lists. Since there is no application section of the data set overlapping with the group section (7, 7) of the in-process entry, renewal of the in process entry is not permitted. Since the parallel group termination number of the in-process entry becomes equal to the final job step number "YES" in step 27 of FIG. 11), the in-process entry is set as the heading entry (in step 29 of FIG. 12), and step 30 and subsequent steps are executed. The condition of the parallel group list in this timing is shown in FIG. 29, with the in-process entry shown as 273.

Figure 12:
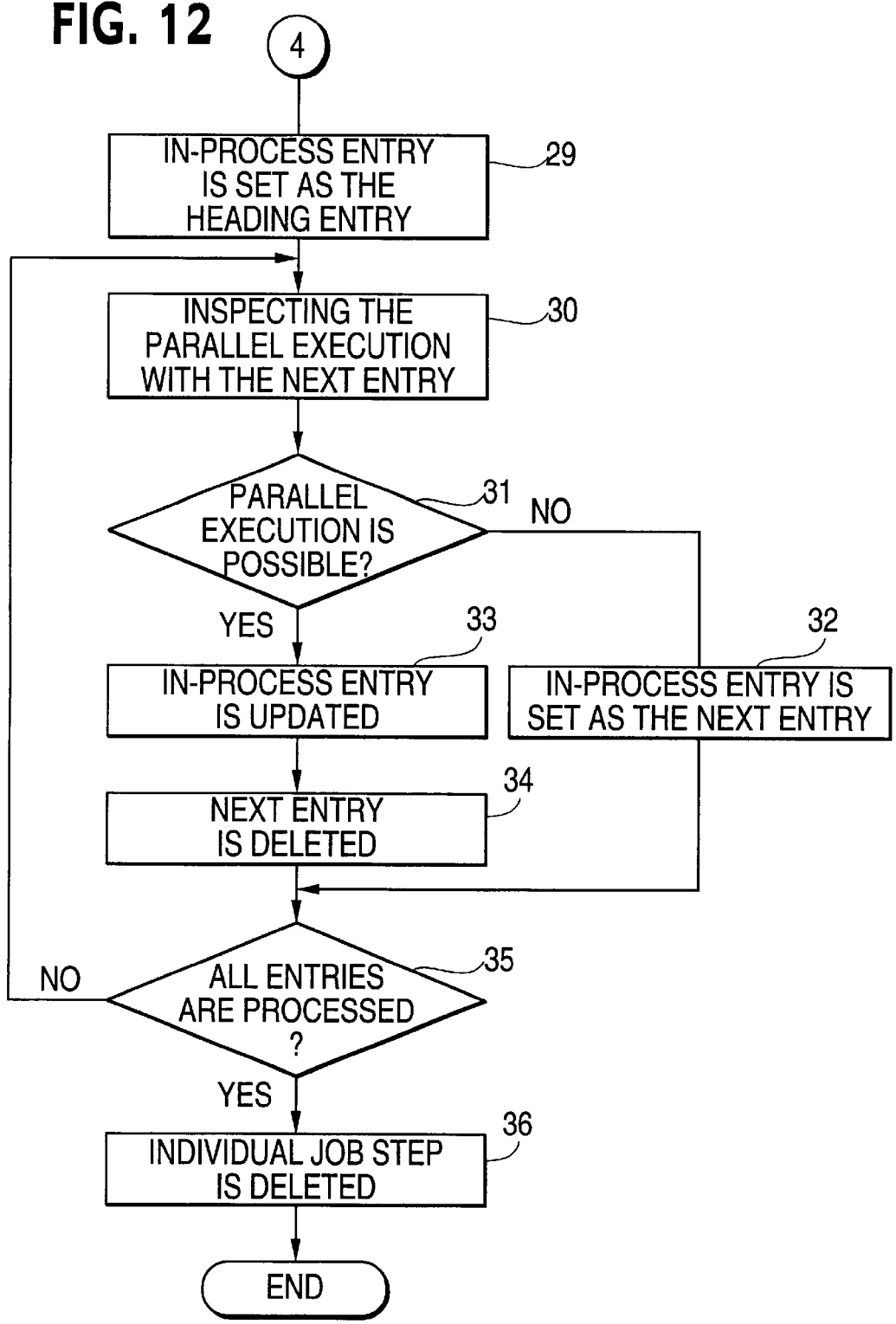
FIG. 12 is a structural flowchart (No. 4) of the present invention.

FIG. 12 is structural flowchart (No. 4) of the present invention. The job step matrix is inspected in step 30 of FIG. 12 to determine whether parallel execution is possible in the section combining the group section (1, 3) of the in-process entry and the group section (4, 6) of the next entry.

Since parallel execution is disabled for the set of the job step numbers 1 and 4 and the set of the job step numbers 2 and 4, and parallel execution is determined to be impossible in the section combining two group sections "NO" in step 31 of FIG. 12), the entry being processed in step 32 of FIG. 12 is set to the next entry.

Since processing has not yet completed for all entries "NO" in step 35 of FIG. 12), the sequence shifts to step 31 of FIG. 12 to continue processing.

The job step matrix 154 of FIG. 21 is inspected to determine whether the parallel execution is possible in the section combining the group section (4, 6) of the in-process entry and the group section (7, 7) of the next entry.

Since there is no set of job steps disabling parallel execution, parallel execution is possible in the section combining the foregoing two group sections "YES" in the step 31 of FIG. 12).

Figure 30:
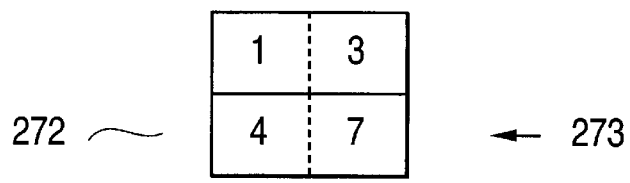
FIG. 30 is a diagram of a further parallel group list of the present invention.

The section combining the group section of the in-process entry and the group section of the next entry is set as the new group section of the in-process entry in step 33 of FIG. 12, and the next entry is deleted (step 34 of FIG. 12). The condition of the parallel group list at this time is shown in FIG. 30, with the in-process entry shown as 273.

Since the in-process entry becomes the final entry and processing is complete for all entries "YES" in step 35 of FIG. 12), the entry of the individual job step in which the parallel group heading number is equal to the parallel group termination number in the parallel group list in step 36 is deleted. Since there is no entry of an individual job step, the parallel group list does not change.

Figure 31:
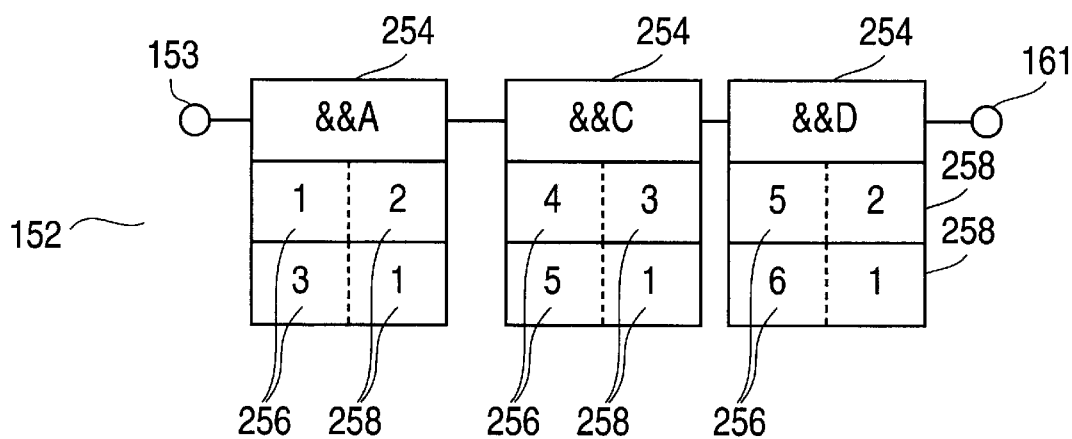
FIG. 31 is a diagram of a list of the data set name lists.

With the processing explained herein above, the parallelization inspection for job steps is completed. The condition of the final parallel group list 272 is shown in FIG. 30 and the data set name list 152 is shown in FIG. 31.

Since use of the above-mentioned inspection result teaches which part of the JCL to change to make possible the application of parallel job steps and pipe data sets, conversion to display or output of the inspection result list and parallel job step and to JCL designated by a plurality of job steps to which the pipe data set is applied may be realized. In the JCL listed as an example, data sets &&A, &&C, &&D listed in the data set name list allow the application of the pipe data set. When the pipe data set is to be applied to data set &&A, changing the DD statement number 2 of job step number 1, and of job step number 3 is all that is required.

Moreover, since the sections defined by job step numbers 1 to 3, and 4 to 7 indicated by each entry of the parallel group list are parallel-executable parallel groups, designating the parallel group in the EXEC statement of each job step number is sufficient.

An example of an inspection result list (diagnosis result list) obtained by using such an inspection result is shown in FIG. 32. In FIG. 32, contents to be updated are indicated on the right side of the "<=" sign for the corresponding rows requiring correction at the time the JCL is changed. The item PARAGRP is a parallel group name indicating that the designation of a parallel group is necessary. The job steps in which the parallel group name are identical become the same parallel group. The next item "PIPE" is a pipe data set name indicating that designation of the pipe data set is necessary. The parallel group name is in the format in which G is added before the entry number of the parallel group list. The pipe data set name is in the format in which a serial number is given to a data set name list and P is added before the serial number.

FIG. 33 shows an example of JCL which has been converted and output for designation of parallel job steps. FIG. 33 also shows an example of the JCL output as the parallel job step JCL to external file 140 of FIG. 1. As a parameter of the parallel group, one of PARAGRP=G001 and PARAGRP=G002 is newly added to each job step control statement. Moreover, the data set name is changed to the pipe data set name and a unit parameter is added thereto (i.e., P001, P002, and P003).

As explained above, the present invention considers the job steps as the object of processing procedures. A job is assumed as a unit of a series of processing procedures to be executed in parallel. However, the present invention is not limited thereto and can be applied to processing in which a plurality of continuous processing is executed in a plurality of processing apparatuses.

Therefore, the processing procedures considered as the inspection object for parallel execution of the processing procedures are not always required to be continuous, and such processing procedures may be that selected intermittently.

Moreover, the selection of procedures is not always performed in a unit of a job; the parallel-executable procedures can be selected for the procedure groups considering the attributes of procedures (kind, execution time schedule, application resources, owners and belonging, etc.).

With the job step parallelization inspecting apparatus and method of the present invention, the exclusively used data set and the pipe data set are inspected for JCL for a plurality of job steps to determine the parallel groups of the parallel-executable job steps, to generate JCL utilizing the determined parallel job steps, and to execute directly the decided parallel job steps. Particularly, the composite analysis of exclusively used data set and pipe data set has enabled easier execution of complicated parallel-executable job steps.

The pipe data set is transmitted and received as a buffer using a region of typically 64 kilobytes (KB) to 128 KB in system memory. Therefore, the pipe data set may encounter conditions such as the pipe data set full condition or the pipe data set empty condition. As explained briefly herein above, in the pipe data set full condition, the pipe data set is full of data and no output can be provided until data in the pipe data set is read out from the pipe data set to generate an empty area in the pipe data set. In contrast, in the pipe data set empty condition, no data is in the pipe data set and input from the pipe data set is impossible until data is written into the pipe data set. When output of data to two or more pipe data sets is combined with reception of data from two or more pipe data sets, deviations in the flow may sometimes result in a dead lock condition due to the pipe data set full condition and the pipe data set empty condition.

Figure 35:
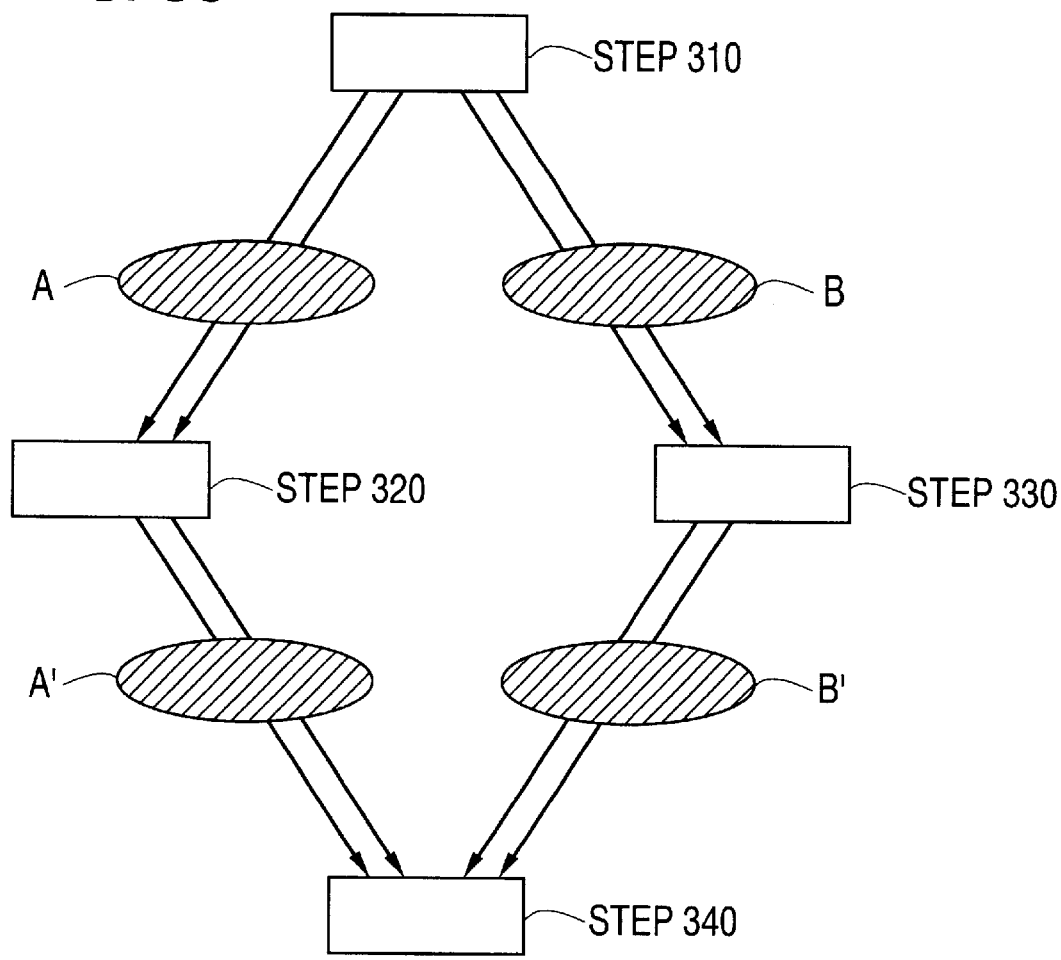
FIG. 35 is a diagram explaining dead lock.

The dead lock condition occurs, for example as shown in FIG. 35, if four job steps are executed in parallel but job step 310 is waiting because job step 310 cannot write to pipe data set A because pipe data set A is full, while job step 340 is waiting because job step 340 cannot read data from pipe data set B' because pipe data set B' is empty. Step 340 reads data from both pipe data set A' and pipe data set B'. Since pipe data set B' is empty, step 340 cannot read data from pipe data set A' and complete. Accordingly, pipe data set A remains full.

Figure 34:
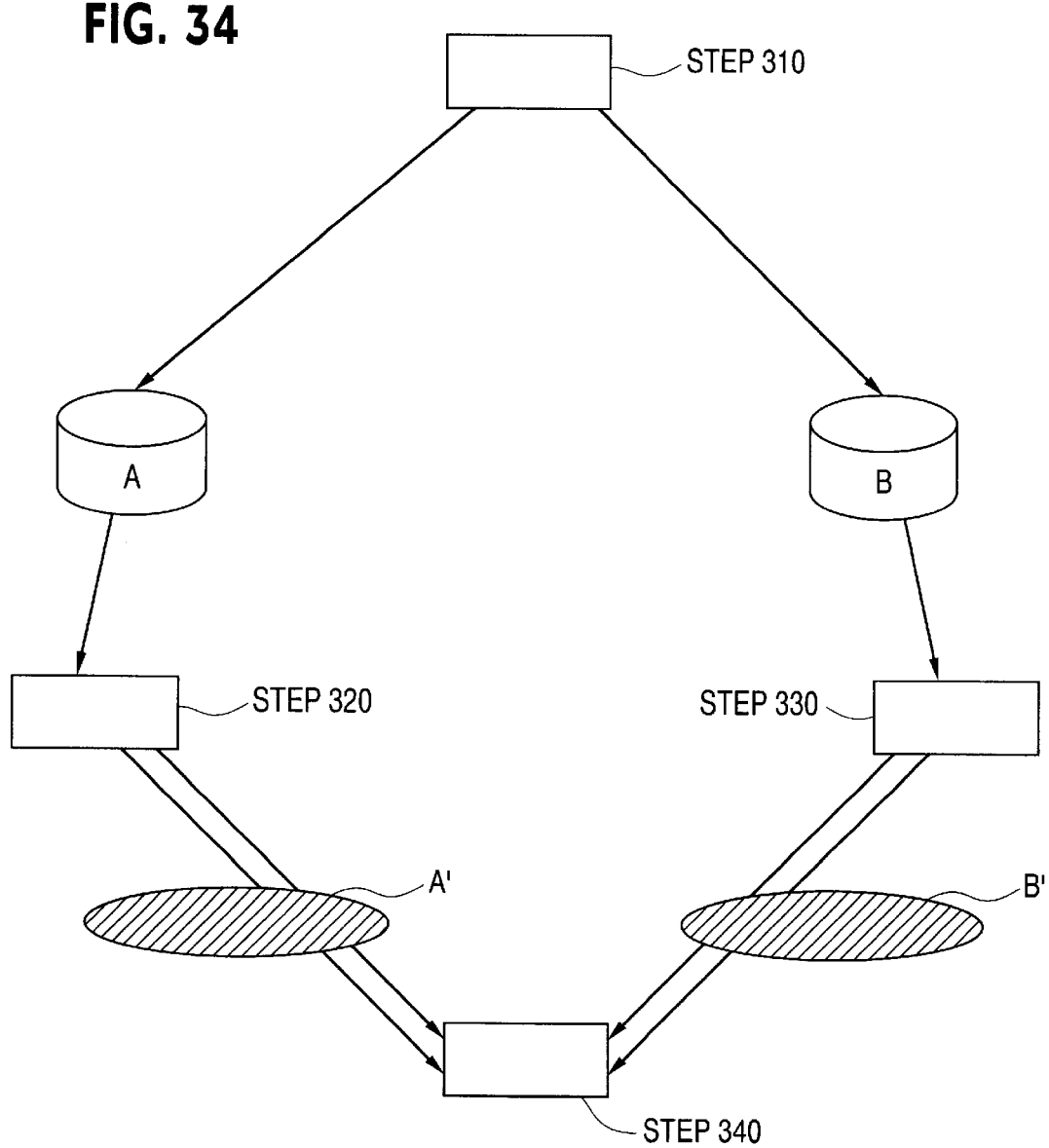
FIG. 34 is a diagram explaining dead lock avoidance in connection with the present invention.

In dead lock analysis, if the data flow which exists results in the dead lock condition exists as shown in FIG. 34, parallel execution of the job step indicating the starting or ending point of the data is disabled or the pipe data set indicating the starting or ending point of data is not applied. Therefore, the generation of the dead lock condition is prevented.

FIG. 34 shows an example of preventing generation of the dead lock condition by disabling parallel execution of the job step indicating the starting point of data.

As shown in FIG. 34, to prevent the dead lock condition from occurring, each of the job step 320, 330, 340, and 310 are individually executed. Step 310, as shown, writes data to each of General Data Set A and General Data Set B. Steps 320 and 330, which are executed in parallel as members of the same job step group, then read data from, respectively, General Data Set A and General Data Set B. Step 320 then writes data to pipe data set A', which pipe data set is read by step 340. Further, step 330 writes data to pipe data set B', which pipe data set is also read by step 340.

The present invention is not limited to the embodiments, described above, but also encompasses variations thereof.

Although the above-mentioned embodiments of the present invention describe implementations using Job Control Language, job steps, and data set names, the present invention could also be implemented using alternate computer hardware and software architectures (MVS™, VM™, VSE™, UNIX™, OS/400, client/server, workstation, personal computer, etc.).

A wide range of different working modes can be formed based on the present invention without deviating from the spirit and scope of the present invention. The present invention, therefore, is not restricted by its specific working modes except being limited by the appended charges.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
   parallelization inspecting means for selecting parallel-executable processing procedures by inspecting an access method to a data set by the processing procedures and by inspecting accessing conditions to the data set by each of the processing procedures, and for registering in a matrix remaining processing procedures; and
   a parallel job executing apparatus, coupled to the parallelization inspecting means, selecting and executing in parallel the parallel-executable processing procedures based upon the accessing conditions, and executing in series the remaining processing procedure, said remaining processing procedures being included in the matrix.

2. The apparatus according to claim 1, wherein said parallelization inspecting means selects the parallel-executable processing procedures by discriminating pipe data sets.

3. The apparatus according to claim 1, wherein said parallelization inspecting means selects the parallel-executable processing procedures by discriminating exclusively used data sets.

4. The apparatus according to claim 1, wherein said parallelization inspecting means enables parallel execution for the processing procedures, as a same processing procedure group, which are not in competition in a subsequent data set with the parallel-executable processing procedures by discriminating pipe data sets.

5. The apparatus according to claim 1, wherein said parallelization inspecting means comprises processing procedure instruction analyzing means for analyzing processing procedure instructions.

6. The apparatus according to claim 5, wherein said parallelization inspecting means comprises processing procedure reading means for reading processing procedure instructions to designate a plurality of processing procedures.

7. The apparatus according to claim 1, wherein said parallelization inspecting means comprises list editing means for outputting an edited inspection result list.

8. The apparatus according to claim 1, comprising processing procedure output means for outputting processing procedure executing instructions required for execution of the parallel processing procedures on the basis of an inspection result from said processing procedure parallelization inspecting means.

9. The apparatus as claimed in claim 1, wherein the parallel processing execution apparatus determines parallel execution for procedure groups selected on the basis of attributes of each procedure as a plurality of processing procedures.

10. A parallel processing procedure selecting method determining whether processing procedures are executable by a computer in parallel with each other, said method comprising:
    inspecting data sets and attributes thereof used in each processing procedure among a plurality of processing procedures; and selecting parallel-executable processing procedures based upon accessing conditions of the processing procedures to the data sets for execution in parallel, registering other of the processing procedures in a matrix, and selecting the other of the processing procedures for execution in series based upon the matrix.

11. A parallel processing procedure selecting method set forth in claim 10, wherein one of the attributes of said data set is a pipe data set.

12. A parallel processing procedure selecting method set forth in claim 10, wherein one of the attribute of said data set is an exclusively used data set.

13. A parallel processing procedure selecting method set forth in claim 10, further comprising the steps of:
  reading a processing procedure instruction having designated execution of a plurality of processing procedures;
  inspecting a data set and attributes thereof used in each of the plurality of processing procedures;
  selecting parallel-executable processing procedures; and
  executing in parallel the processing procedures of which subsequent data sets are not in competition with each other as a same processing procedure group.

14. A parallel processing procedure executing method set forth in claim 10, wherein parallel-executable processing procedures are selected to generate, thereafter, the parallel-executable processing procedures.

15. A parallel processing procedure selecting method set forth in claim 10, wherein a processing procedure designating a plurality of processing procedures is read and analyzed to select the parallel-executable processing procedures.

16. A parallel processing procedure selecting method set forth in claim 10, wherein parallel-executable processing procedures are selected to output a list of the parallel processing procedure names.

17. A parallel processing procedure executing method set forth in claim 10, wherein a processing procedure designating a plurality of processing procedures is read directly for parallel execution.

18. A parallel processing procedure executing method as claimed in claim 10, further comprising the step of:
  inspecting parallel execution for a procedure group selected on the basis of an attribute of each procedure as a plurality of processing procedures.

19. A parallel processing procedure selecting method set forth in claim 13, wherein the selecting step selects the parallel-executable processing procedures based on the attributes.

20. A method comprising:
  determining which of processing units are executable in parallel by a computer based upon accessing conditions of the processing units to the data sets; and
  executing by the computer in parallel the processing units determined to be executable in parallel, and otherwise executing the processing units in series based upon the series-executed processing units being registered in a matrix.

21. The method as set forth in claim 20, wherein the attributes indicate that the data sets are one of exclusive use, sequential, and pipelined.

22. The method as set forth in claim 21, wherein the data sets having attributes indicating that the respective data sets are pipelined are executable in parallel.

23. The method as set forth in claim 20, wherein the attributes of the data sets determine whether the processing units are executable in parallel.

24. A method comprising:
  inspecting by a computer accessing conditions of each program to files; and
  selecting the programs executable in parallel with each other based on the accessing conditions, and otherwise selecting remaining of the programs for execution in series based upon the series-selected processing units being registered in a matrix.

25. The method according to claim 24, wherein the accessing conditions include pipeline data set and a file type.

26. The apparatus according to claim 1, wherein the parallelization inspecting means inspects each job step as the parallel executable processing procedures.

27. The apparatus according to claim 26, wherein said parallelization inspecting means comprises:
  a JCL reading and analyzing section reading job steps having corresponding data sets, and
  a parallelization inspection apparatus, coupled to the JCL reading and analyzing section, determining which of the job steps are executable in parallel.

28. The apparatus according to claim 27, wherein said parallelization inspection apparatus comprises:
  a data set name list generating section receiving the job steps and generating a data set name list;
  a data set applicability inspecting section, coupled to the data set name list generating section, selecting data sets ensuring parallel-executable job steps; and
  a parallel executability inspecting section, coupled to the data set applicability inspecting section, determining whether the job steps are parallel-executable based on the data sets, and deleting from the data set name list job steps not executable in parallel.

29. The apparatus according to claim 28, wherein said parallelization inspection apparatus further comprises:
  a parallel group deciding section, coupled to the parallel executability inspecting section, determining whether parallel-executable job steps can be grouped into a same parallel group based on the data sets.

30. The apparatus according to claim 26, wherein the parallelization inspecting means comprises:
  an input section inputting job steps written in Job Control Language, and
  a job step parallelization inspecting apparatus determining which of the job steps are executable in parallel, and wherein said parallel job executing apparatus executes in parallel the job steps.

31. The apparatus according to claim 26, wherein said parallelization inspecting means comprises a job step parallelization inspecting apparatus comprising:
  a Job Control Language reading and analyzing section reading Job Control Language, said Job Control Language comprising job steps and corresponding data sets,
  a parallelization inspection apparatus, coupled to the Job Control Language reading and analyzing section, determining which of the job steps are executable in parallel, said parallelization inspection apparatus comprising:
    a data set name list generating section receiving the job steps and generating a data set name list;
    a data set applicability inspecting section, coupled to the data set name list generating section, selecting data sets ensuring parallel-executable job steps;
    a parallel executability inspecting section, coupled to the data set applicability inspecting section, determining whether the job steps are parallel-executable based on the data sets, and deleting from the data set name list job steps not executable in parallel; and a parallel group deciding section, coupled to the parallel executability inspecting section, determining whether parallel-executable job steps can be grouped into a same parallel group based on the data sets, a list editing section, coupled to the parallelization inspection section, editing the parallel-executable parallel groups for printing and editing an output of JCL output for printing, a JCL output section, coupled to the parallelization inspection section, outputting a plurality of job steps JCL to one of the list editing section and to an external file, and a parallel job executing apparatus, coupled to the job step parallelization inspection apparatus, and to the external file, executing in parallel the parallel-executable parallel groups.

* * * * *

UNITED STATES PATENT AND TRADEMARK OFFICE
CERTIFICATE OF CORRECTION

PATENT NO.    : 6,279,025 B1
DATED         : August 21, 2001
INVENTOR(S)   : Hiroaki Yamamoto et al.

It is certified that error appears in the above-identified patent and that said Letters Patent is hereby corrected as shown below:

<u>Column 16,</u>
Line 22, change "procedure" to -- procedures --.

Signed and Sealed this

Twenty-sixth Day of March, 2002

*Attest:*

*Attesting Officer*

JAMES E. ROGAN
*Director of the United States Patent and Trademark Office*